(12) United States Patent
McHugh et al.

(10) Patent No.: US 11,145,096 B2
(45) Date of Patent: Oct. 12, 2021

(54) SYSTEM AND METHOD FOR AUGMENTED REALITY INTERACTION

(71) Applicant: Samsung Electronics Co., Ltd, Suwon-si (KR)

(72) Inventors: Andrew McHugh, Freemount, CA (US); Duncan Knarr, Santa Rosa, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/157,981

(22) Filed: Oct. 11, 2018

(65) Prior Publication Data

US 2019/0279407 A1    Sep. 12, 2019

Related U.S. Application Data

(60) Provisional application No. 62/639,839, filed on Mar. 7, 2018.

(51) Int. Cl.
| | | |
|---|---|---|
| *G06T 11/60* | (2006.01) | |
| *G06T 11/00* | (2006.01) | |
| *G06T 19/00* | (2011.01) | |
| *G09G 5/377* | (2006.01) | |
| *G09G 5/02* | (2006.01) | |

(52) U.S. Cl.
CPC ............ *G06T 11/60* (2013.01); *G06T 11/001* (2013.01); *G06T 19/006* (2013.01); *G09G 5/026* (2013.01); *G09G 5/377* (2013.01); *G06T 2200/24* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 7,719,542 B1 | 5/2010 | Gough et al. | |
| 8,941,559 B2 | 1/2015 | Bar-Zeev et al. | |
| 9,678,343 B2 | 6/2017 | Kuehne et al. | |
| 9,804,759 B2 | 10/2017 | Wilson et al. | |

(Continued)

FOREIGN PATENT DOCUMENTS

KR    101810980 B1    12/2017

OTHER PUBLICATIONS

ISA/KR, International Search Report and Written Opinion of the International Searching Authority, International Application No. PCT/KR2019/002655, dated Jun. 20, 2019, 8 pages.

*Primary Examiner* — Michelle Chin

(57) ABSTRACT

A method, an electronic device, and computer readable medium is provided. The method includes identifying a plurality of virtual objects for output to a display of the electronic device, including a priority level for each of the plurality of virtual objects. The method also includes comparing the priority level of an object of the plurality of virtual objects to the priority level associated with another object of the plurality of virtual objects to determine whether to modify an appearance of either object. In response to determining to modify the appearance of either object, the method further includes modifying the appearance of either. The method additionally includes rendering the plurality of virtual objects on the display of the electronic device.

20 Claims, 21 Drawing Sheets

(56) References Cited

U.S. PATENT DOCUMENTS

| | | | |
|---|---|---|---|
| 9,897,805 B2 | 2/2018 | Stafford et al. | |
| 2002/0044152 A1 | 4/2002 | Abbott, III et al. | |
| 2006/0036568 A1* | 2/2006 | Moore | G06F 16/168 |
| 2007/0245052 A1* | 10/2007 | Huang | G06F 13/364 |
| | | | 710/113 |
| 2012/0154619 A1 | 6/2012 | Lee | |
| 2012/0323757 A1* | 12/2012 | Monroe | G06Q 40/04 |
| | | | 705/37 |
| 2013/0232152 A1* | 9/2013 | Dhuse | G06F 16/2228 |
| | | | 707/741 |
| 2014/0343404 A1* | 11/2014 | Razzaque | A61B 8/0841 |
| | | | 600/424 |
| 2014/0372957 A1 | 12/2014 | Keane et al. | |
| 2015/0091943 A1 | 4/2015 | Lee et al. | |
| 2016/0034042 A1 | 2/2016 | Joo et al. | |
| 2016/0063766 A1 | 3/2016 | Han et al. | |
| 2016/0110921 A1 | 4/2016 | Takahashi et al. | |
| 2016/0259977 A1 | 9/2016 | Asbun et al. | |
| 2017/0060230 A1 | 3/2017 | Faaborg et al. | |
| 2017/0076142 A1 | 3/2017 | Chang | |
| 2017/0337712 A1 | 11/2017 | Nakashima et al. | |
| 2017/0372499 A1 | 12/2017 | Lalonde | |
| 2018/0005424 A1 | 1/2018 | Niinuma et al. | |
| 2018/0046929 A1* | 2/2018 | Xuan | G06Q 10/00 |
| 2019/0060001 A1* | 2/2019 | Kohli | A61B 90/37 |
| 2019/0180483 A1* | 6/2019 | DeLuca | G06T 11/60 |

* cited by examiner

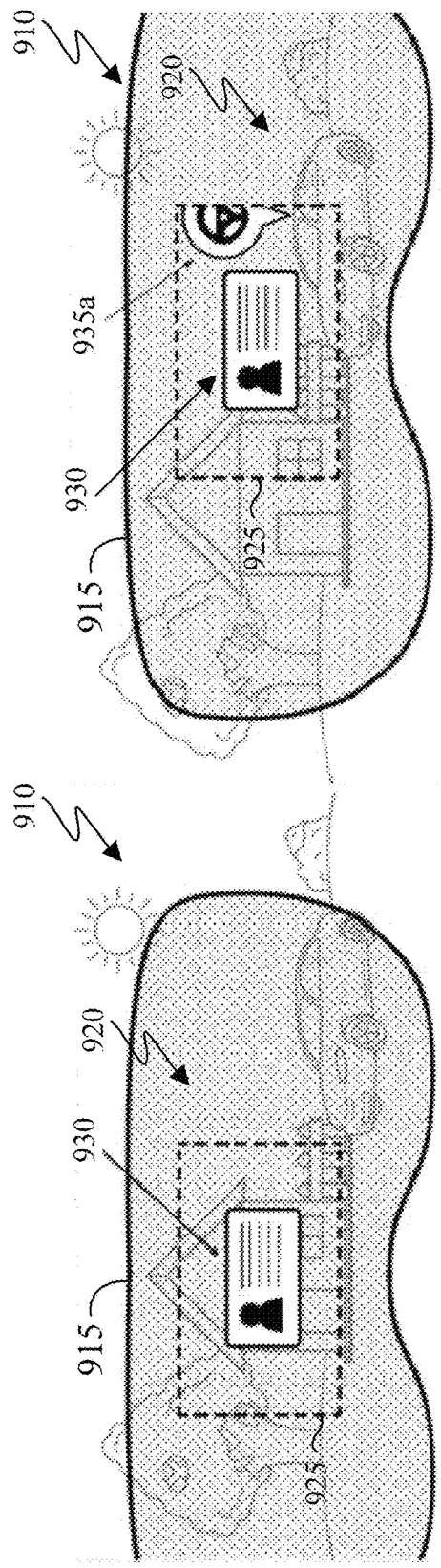
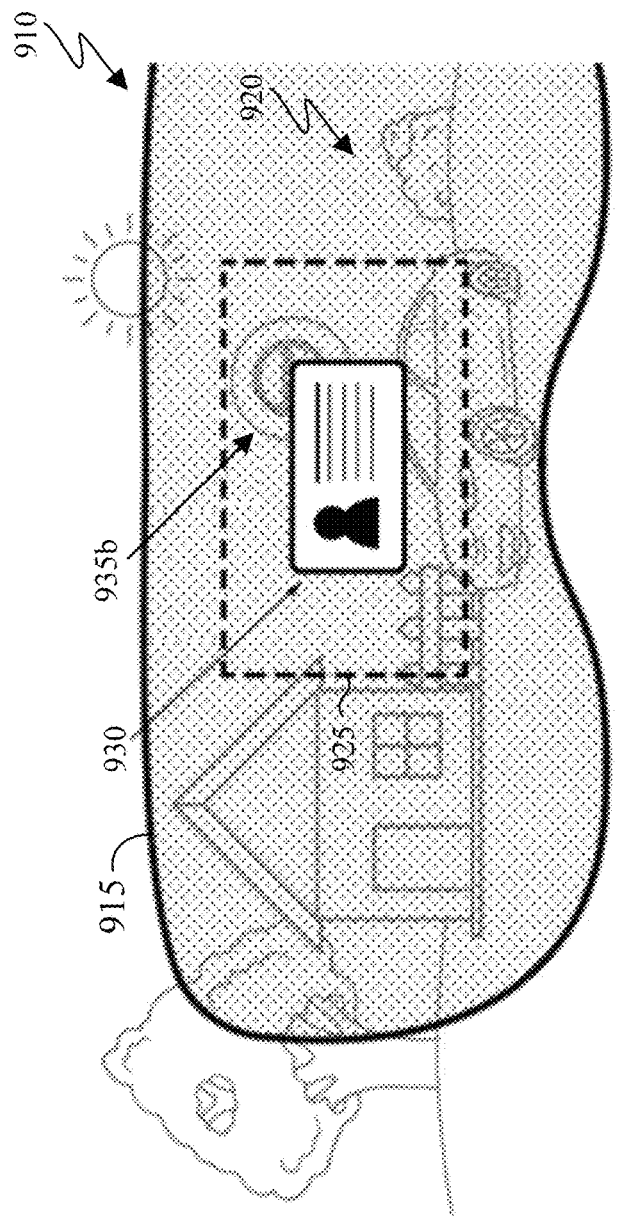
FIG. 9A
FIG. 9B
FIG. 9C

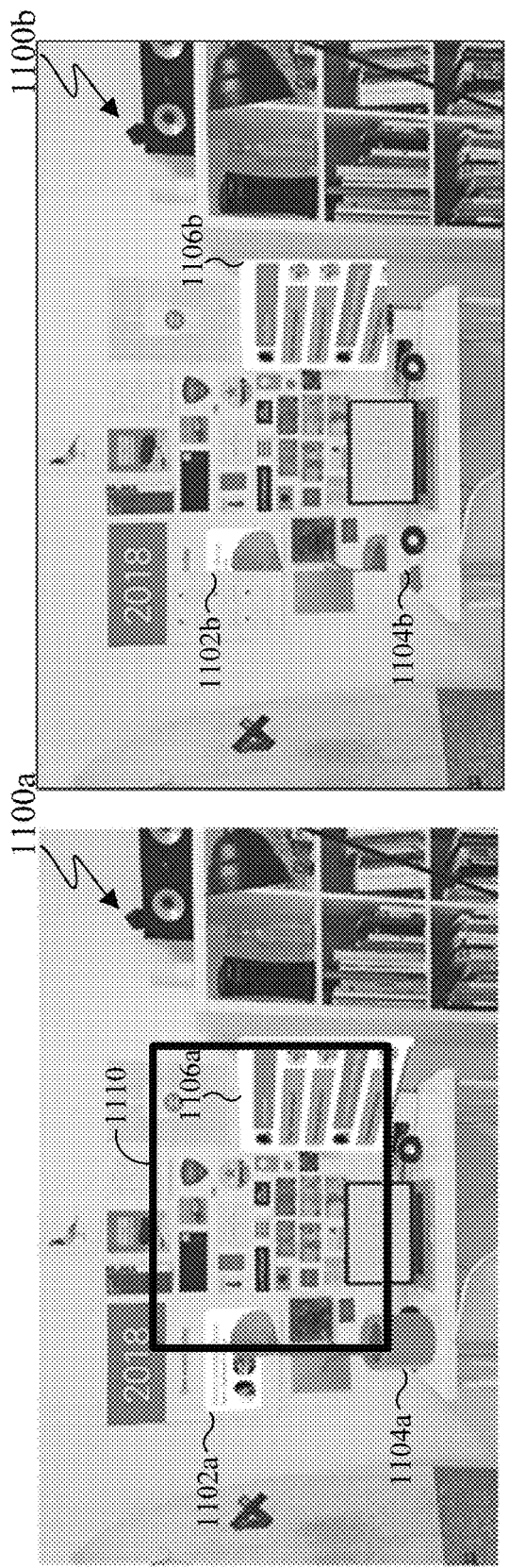
FIG. 11A
FIG. 11B
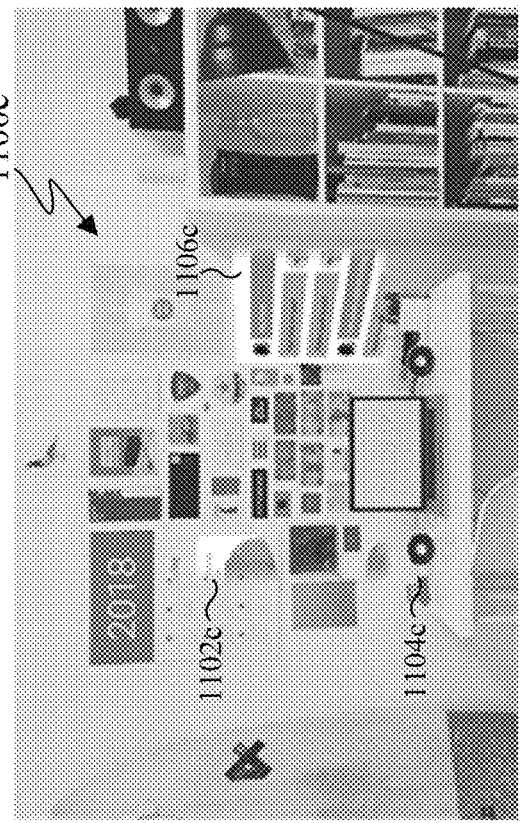
FIG. 11C

SYSTEM AND METHOD FOR AUGMENTED REALITY INTERACTION

CROSS-REFERENCE TO RELATED APPLICATION AND CLAIM OF PRIORITY

This application claims priority under 35 U.S.C. § 119(e) to U.S. Provisional Patent Application No. 62/639,839 filed on Mar. 7, 2018. The above-identified provisional patent application is hereby incorporated by reference in its entirety.

TECHNICAL FIELD

This disclosure relates generally to head mounted display systems. More specifically, this disclosure relates to interactive visual modifications to virtual objects rendered in a head mounted display environment.

BACKGROUND

Virtual reality and augmented reality experiences are becoming prominent. For example, 360° video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene they desire. Display and navigation sensors track head movement in real-time to determine the region of the 360° video that the user wants to view.

SUMMARY

This disclosure provides a system and method for augmented reality interaction.

In one embodiment, a method is provided. The method includes identifying a plurality of virtual objects for output to a display of the electronic device, including a priority level for each of the plurality of virtual objects. The method also includes comparing the priority level of an object of the plurality of virtual objects to the priority level associated with another object of the plurality of virtual objects to determine whether to modify an appearance of either object. In response to determining to modify the appearance of either object, the method further includes modifying the appearance of either. The method additionally includes rendering the plurality of virtual objects on the display of the electronic device.

In another embodiment, an electronic device is provided. The electronic device includes a display and a processor. The processor is operably coupled to the display. The processor is configured to identify a plurality of virtual objects for output to the display of the electronic device, including a priority level for each of the plurality of virtual objects. The processor is also configured to compare the priority level of an object of the plurality of virtual objects to the priority level associated with another object of the plurality of virtual objects to determine whether to modify an appearance of either object. In response to determining to modify the appearance of either object, the processor is further configured to modify the appearance of either object. The processor is additionally configured to render the plurality of virtual objects on the display of the electronic device.

In another embodiment, a non-transitory computer readable medium embodying a computer program is provided. The computer program includes computer readable program code that, when executed by a processor of an electronic device, causes the processor to identify a plurality of virtual objects for output to a display of the electronic device, including a priority level for each of the plurality of virtual objects; compare the priority level of an object of the plurality of virtual objects to the priority level associated with another object of the plurality of virtual objects to determine whether to modify an appearance of either object; in response to determining to modify the appearance of either object, modify the appearance of either; and render the plurality of virtual objects on the display of the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A, 9B, and 9C, illustrate an example head mounted display depicting various augmented reality objects based on an example priority system in accordance with an embodiment of this disclosure;

FIGS. 11A, 11B, and 11C illustrate an example display depicting various augmented reality objects in accordance with an embodiment of this disclosure;

DETAILED DESCRIPTION

Figure 1:
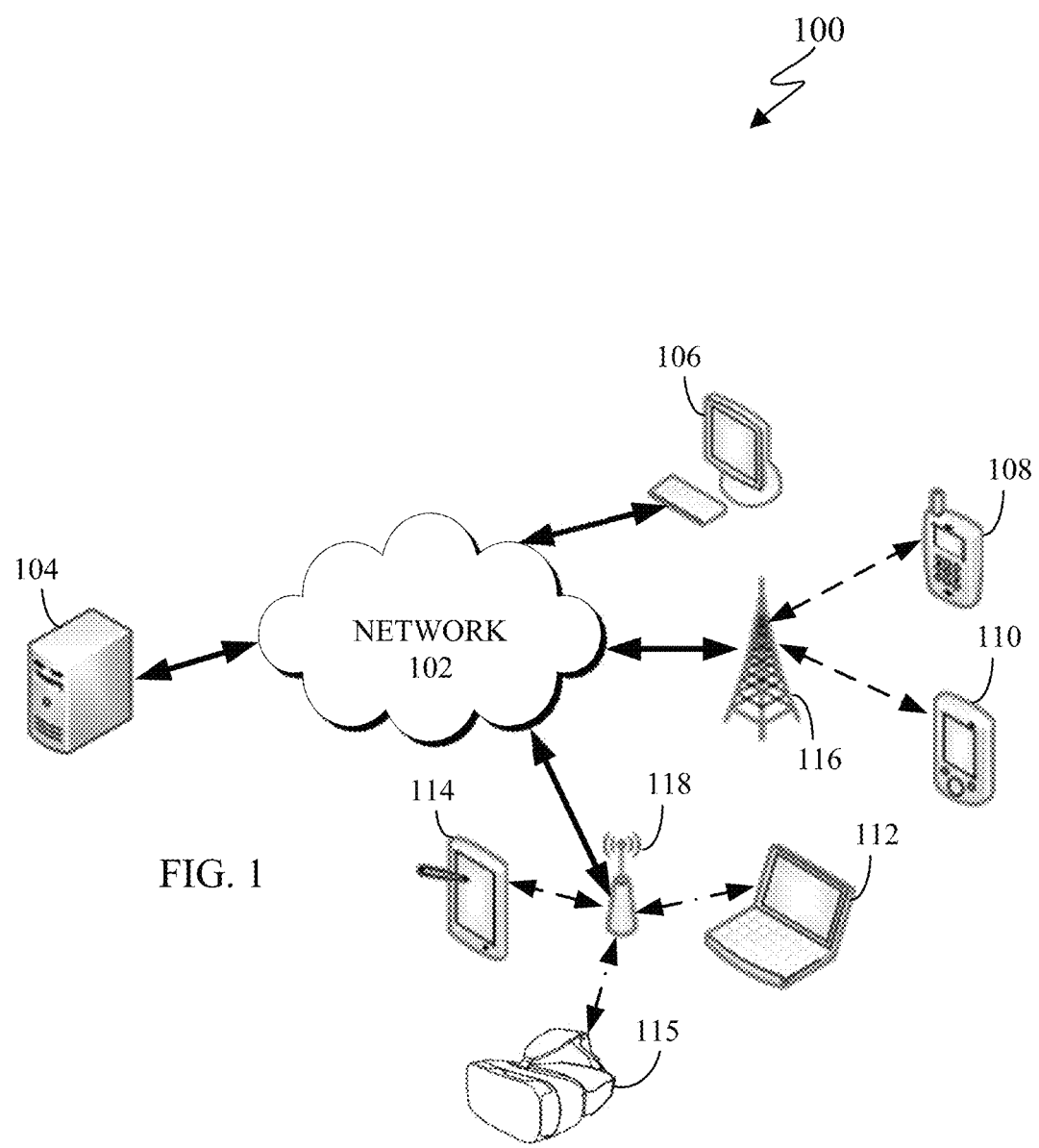
FIG. 1 illustrates an example communication system in accordance with embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of the present disclosure, certain electronic devices include a graphical user interface (GUI) such as a display that allows a user to view content displayed on the display and interact with the electronic device. The content displayed on a display screen of an electronic device can include user interface objects such as, icons, images, videos, control elements such as buttons and other graphics, and the like. A user can interact with the user interface objects via a user input device, such as a keyboard, mouse, a touchpad, a controller, as well as sensors able to detect and capture body movements and motion. If the display includes a touch panel, such as a touchscreen display, a user can interact with the content displayed on the electronic device by simply touching the display via a finger of the user or a stylus. If the display is a head-mounted display (HMD) and includes motion sensors or eye tracking sensors, a user can interact with the content displayed on the electronic device by simply moving a portion of the their body that is connected with the motion sensor. It is noted that as used herein, the term "user" may denote a human or another device (e.g., an artificial intelligent electronic device) using the electronic device.

An electronic device, according to embodiments of the present disclosure, can include personal computers (such as a laptop, a desktop), a workstation, a server, a television, an appliance, a wearable device (such as a HMD and smart glasses, a smart watch), a mobile medical device (such as a blood sugar measuring device, a heartbeat measuring device, or a body temperature measuring device), and the like. Additionally, the electronic device can be at least one of a part of a piece of furniture or building/structure, an electronic board, an electronic signature receiving device, a projector, or a measurement device. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, a navigation device, a global positioning system (GPS) receiver, virtual reality headsets, portable game consoles, cameras, and wearable devices, among others. The electronic device is one or a combination of the above-listed devices. Additionally, the electronic device as disclosed herein is not limited to the above-listed devices, and can include new electronic devices depending on the development of technology.

Virtual reality (VR), augmented reality (AR), and mixed reality (MR) are a rendered version of a visual scene on a display or a headset. The rendering is designed to mimic the visual and audio sensory stimuli of the real world as naturally as possible to an observer or user as they move within the limits defined by the application. For example, VR places a user into immersive worlds that interact with their head movements. At the video level, VR is achieved by providing a video experience that covers as much of the field of view (FOV) of a user as possible together with the synchronization of the viewing angle of the rendered video with the head movements. In another example, AR allows a user to view the outside world and renders virtual objects as an overlay onto the real world. AR is achieved by providing virtual objects that cover portions of the FOV of the user with the synchronization of the viewing angle of the rendered video with the head movements. For example, in an AR environment, objects in the real-world are augmented by computer-generated perceptual information. MR combines aspects of VR and AR. For example, MR can combine VR with AR in gaming, travel, media streaming, and the like. Although multiple types of devices are able to provide such an experience, head-mounted displays (HMD) are the most popular. Typically HMDs rely on either (i) a dedicated screens integrated into the device and running with external computers, or (ii) a smartphone inserted into a headset via brackets. The first approach utilizes lightweight screens and benefits from a high computing capacity. In contrast the smartphone-based systems, utilizes a higher mobility and can be less expensive to produce. In both instances, the video experiences generated are similar. An additive screen is a type of display screen where light is projected on a transparent or semi-transparent surface, such as a visor. A transparent LCD is a type of display that enables a user to view what is shown on the screen while still being able to see through the screen.

When viewing VR, AR, and MR content in an omnidirectional format, the FOV of a user is limited to a portion of the entirety of the omnidirectional content. That is, if a FOV of a user is 135° horizontally, and the omnidirectional content is 360° horizontally, then the user is only capable of viewing a portion of the omnidirectional VR content at a given moment. As the user changes their FOV, the rendered objects or scene rotates to match the movements of the user.

Methods for interacting with and controlling computing devices capable of VR, AR, and MR are striving to conform to more natural approaches. Computing devices, such as personal computers, smart phones, tablets, head mounted displays and the like, utilize graphical user interfaces (GUI) on a display screen to facility a user to visually understand the information presented by the computing device. Objects such as text, images, and video are displayed on a screen and the user can employ various instruments to control the computing device such as, a keyboard, a mouse, a touchpad. The advent of head mounted displays coupled with the prominence of virtual reality and augmented reality can use new approaches to interact with computing devices.

Embodiments of the present disclosure recognize and take into consideration that, displayed objects can overlap, causing difficulty for the user to view both objects simultaneously. For example, displaying solid or opaque virtual objects for all the virtual objects displayed on a display can cause confusion when two or more virtual objects overlap. For instance, text, images, and video can be displayed either fixed to an object in the real world or remains in the same line of sight as the user. That is, some elements can follow the head position of a user, while other elements are pinned to or affixed to an object in the real world, while additional elements can momentarily become visible, such as a notification. The various virtual objects (fixed elements and moveable elements) can overlap making it difficult for a user to view both objects at the same instant. Therefore, embodiments of the present disclosure provide systems and methods for detecting circumstances when two or more objects overlap and modifies one or more of the objects. The modification can include fading the object to reduce its visibility while maintaining the visibly to one of the rendered objects. For example, fading non-focused user interface objects or elements can distinguish and focus the user attention and to avoid confusion when displayed elements overlap.

Embodiments of the present disclosure also recognize and take into consideration that, rendered objects can extend beyond the display in an AR environment. For example, if part of an object is rendered on the display while another part of the object is rendered off the display, the user may be unaware that additional content is available to be viewed. That is, in an AR environment, visible real world FOV is often larger than the display area of the rendered AR elements. As a result, of the difference between the FOV of the user and the display screen, virtual objects displayed on the screen can be cut off as the element extends beyond the size of the screen. Therefore, embodiments of the present disclosure provide systems and methods for detecting circumstances when an object is rendered partially on the display and partially off the display. Embodiments of the present disclosure include applying a gradient alpha border to differentiate between virtual objects that extend beyond the displayed area and virtual objects that do not extend beyond the displayed area. When an object is rendered partially on the display and partially off the display, embodiments of the present disclosure provide systems and methods for fading or softening the edge of the virtual object as it approaches the edge of the screen. By fading the edge of the object provides an indication to the user that additional content is viewable to in a direction beyond the screen (such as to the left, right, up or down).

Embodiments of the present disclosure further recognize and take into consideration that, rendered objects in an AR environment can be difficult to view based on the background lighting conditions of the real world. For example, if the background is dark, and the rendered object is dark, it can be difficult for a user to distinguish between the two objects (a real world object or background, and one virtual object). In another example, virtual objects that are predominantly black can sometimes become transparent on certain types of displays or difficult to distinguish based on the real world background, thereby making the object difficult to perceive. Therefore, embodiments of the present disclosure provide systems and methods for detecting circumstances when virtual objects can be difficult for a user to view. When virtual objects are difficult for a user to view, embodiments of the present disclosure provide systems and methods for increasing the visibility by modifying the brightness of the rendered object in order to increase the objects visibility.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-115. The client devices 106-115 may be, for example, a smartphone, a tablet computer, a laptop, a personal computer, a wearable device, or a HMD. The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or mobile device 108 (such as a smartphone), a personal digital assistant (PDA) 110, a laptop computer 112, a tablet computer 114, and a HMD 115. However, any other or additional client devices could be used in the system 100. HMD 115 can be a standalone device with an integrated display and processing capabilities, or a headset that includes a bracket system that can hold another client device such as mobile device 108. As described in more detail below the HMD 115 can display VR or AR content to one or more users.

In this example, some client devices 108-115 communicate indirectly with the network 102. For example, the client devices 108 and 110 (mobile devices 108 and PDA 110, respectively) communicate via one or more base stations 116, such as cellular base stations or eNodeBs (eNBs). Also, the client devices 112, 114, and 115 (laptop computer 112, tablet computer 114, and HMD 115, respectively) communicate via one or more wireless access points 118, such as IEEE 802.11 wireless access points. Note that these are for illustration only and that each client device 106-115 could communicate directly with the network 102 or indirectly with the network 102 via any suitable intermediate device(s) or network(s).

In certain embodiments, the HMD 115 (or any other client device 106-114) transmits information securely and efficiently to another device, such as, for example, the server 104. The mobile device 108 (or any other client device 106-115) can function as a VR display when attached to a headset and can function similar to HMD 115. The HMD 115 (or any other client device 106-114) can trigger the information transmission between itself and server 104. The HMD 115 can be similar to a pair of classes with a projector allowing a user to view through the display but augments the field of view (FOV) of the user by projecting virtual objects over the objects in the real world.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for fading or altering the opacity of a virtual object displayed in a VR, or AR environment. For example, when two virtual objects are displayed, one of the objects can be faded in order to direct the attention of the user to the non-faded object. Similarly, when two or more virtual objects that are displayed overlap, one or more of the objects can be faded in order to direct the attention of the user to the non-faded object. In another example, if a virtual object extends off the display screen, the virtual object can be faded in order to indicate to a user that additional portions of the object exist beyond the currently displayed portion. In another example, certain virtual objects in the augmented reality can be brightened in order to increase visibility of the virtual object by distinguishing the object from background.

Figure 2:
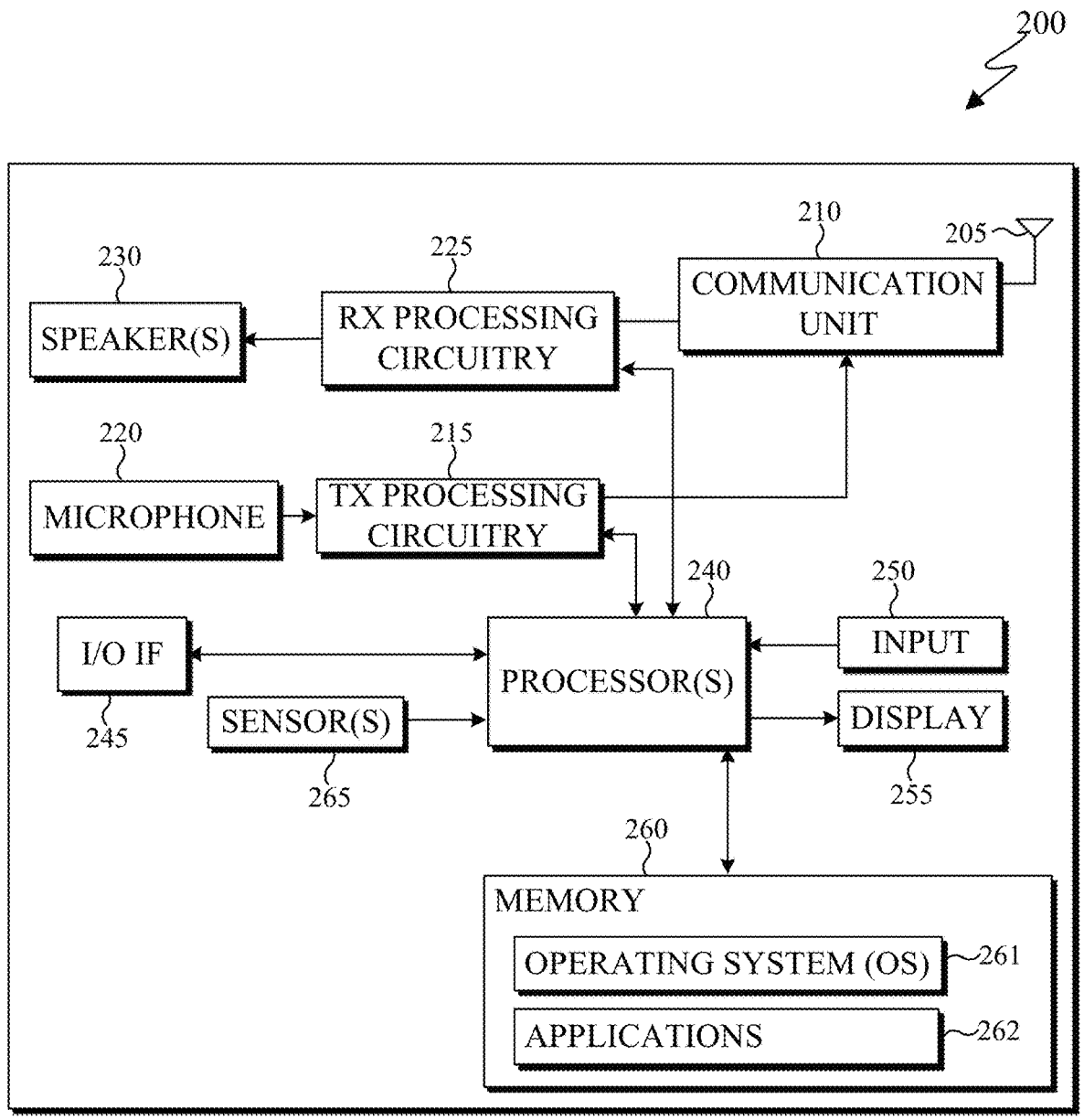
FIG. 2 illustrates an example electronic device in accordance with an embodiment of this disclosure.

FIG. 2 illustrates an electronic device, in accordance with an embodiment of this disclosure. The embodiment of the electronic device 200 shown in FIG. 2 is for illustration only and other embodiments can be used without departing from the scope of this disclosure. The electronic device 200 can come in a wide variety of configurations, and FIG. 2 does not limit the scope of this disclosure to any particular implementation of an electronic device. In certain embodiments, one or more of the client devices 106-115 of FIG. 1 can include the same or similar configuration as electronic device 200.

In certain embodiments, the electronic device 200 is a HMD used to display VR or AR content to a user. In certain embodiments, the electronic device 200 is a computer (similar to the desktop computer 106 of FIG. 1), mobile device (similar to mobile device 108 of FIG. 1), a PDA (similar to the PDA 110 of FIG. 1), a laptop (similar to laptop computer 112 of FIG. 1), a tablet (similar to the tablet computer 114 of FIG. 1), a HMD (similar to the HMD 115 of FIG. 1), and the like. In certain embodiments, the electronic device 200 is a wearable device that includes a GUI that and one or more applications or programs installed thereon.

As shown in FIG. 2, the electronic device 200 includes an antenna 205, a communication unit 210, transmit (TX) processing circuitry 215, a microphone 220, and receive (RX) processing circuitry 225. In certain embodiments, the communication unit 210 is a general communication interface and can include, for example, a RF transceiver, a BLUETOOTH transceiver, or a WI-FI transceiver ZIGBEE, infrared, and the like. The electronic device 200 also includes a speaker(s) 230, processor(s) 240, an input/output (I/O) interface (IF) 245, an input 250, a display 255, a memory 260, and sensor(s) 265. The memory 260 includes an operating system (OS) 261, and one or more applications 262.

The communication unit 210 receives, from the antenna 205, an incoming RF signal such as a BLUETOOTH or WI-FI signal from an access point (such as a base station, WI-FI router, BLUETOOTH device) of a network (such as Wi-Fi, BLUETOOTH, cellular, 5G, LTE, LTE-A, WiMAX, or any other type of wireless network). The communication unit 210 can include, for example, a RF transceiver, a BLUETOOTH transceiver, a WI-FI transceiver, ZIGBEE, infrared, and the like. An RF transceiver down-converts incoming RF signals to generate an intermediate frequency or baseband signal. The intermediate frequency or baseband signal is sent to the RX processing circuitry 225 that generates a processed baseband signal by filtering, decoding, or digitizing, or a combination thereof, the baseband or intermediate frequency signal. The RX processing circuitry 225 transmits the processed baseband signal to the speaker(s) 230, such as for voice data, or to the processor 240 for further processing, such as for web browsing data, image processing, video processing, or a combination thereof. In certain embodiments, speaker(s) 230 includes one or more speakers.

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, digitizes, or a combination thereof, the outgoing baseband data to generate a processed baseband or intermediate frequency signal. The communication unit 210 receives the outgoing processed baseband or intermediate frequency signal from the TX processing circuitry 215 and up-converts the baseband or intermediate frequency signal to an RF signal that is transmitted via the antenna 205.

The processor 240 can include one or more processors or other processing devices and execute the OS 261 stored in the memory 260 in order to control the overall operation of the electronic device 200. For example, the processor 240 can control the reception of forward channel signals and the transmission of reverse channel signals by the communication unit 210, the RX processing circuitry 225, and the TX processing circuitry 215 in accordance with well-known principles. The processor 240 is also capable of executing other applications 262 resident in the memory 260, such as, one or more applications for identifying a objects rendered on a display, and modifying the objects. Example modifications include fading objects by changing the opacity of particular objects, and fading an edge of an object, when the object extends beyond the display, such as the display 255.

The processor 240 can include any suitable number(s) and type(s) of processors or other devices in any suitable arrangement. For example, the processor 240 is capable of natural langue processing, voice recognition processing, object recognition processing, eye tracking processing, and the like. In some embodiments, the processor 240 includes at least one microprocessor or microcontroller. Example types of the processor 240 include microprocessors, microcontrollers, digital signal processors, application specific integrated circuits, and discreet circuitry.

The processor 240 is also capable of executing other processes and programs resident in the memory 260, such as operations that receive, store, and timely instruct by providing processing of various types of content. The processor 240 can move data into or out of the memory 260 as required by an executing process.

The processor 240 is also coupled to the I/O interface 245 that provides the electronic device 200 with the ability to connect to other devices such as the client devices 106 115. For example, the electronic device can connect to and receive applications, such as applications 262, from an external device such as a server (similar to the server 104 of FIG. 1). The I/O interface 245 is the communication path between these accessories and the processor 240. In some embodiments, the processor 240 is configured to execute plurality of applications 262 based on the OS 261 or in response to signals received from eNBs or an operator.

The processor 240 is also coupled to the input 250 and the display 255. The operator of the electronic device 200 can use the input 250 to enter data or inputs, or a combination thereof, into the electronic device 200. Input 250 can be a keyboard, touch screen, mouse, track ball or other device capable of acting as a user interface to allow a user in interact with electronic device 200. For example, the input 250 can include a touch panel, a (digital) pen sensor, a key, an ultrasonic input device, or an inertial motion sensor. The touch panel can recognize, for example, a touch input in at least one scheme along with a capacitive scheme, a pressure sensitive scheme, an infrared scheme, or an ultrasonic scheme. In the capacitive scheme, the input 250 is able to recognize a touch or proximity. Input 250 can be associated with sensor(s) 265, a camera, or a microphone, such as or similar to microphone 220, by providing additional input to processor 240. The input 250 also can include a control circuit.

The display 255 can be a liquid crystal display, light-emitting diode (LED) display, organic LED (OLED), active matrix OLED (AMOLED), or other display capable of rendering text and graphics, such as from websites, videos, games and images, and the like. The display 255 can be sized to fit within a HMD. Display 255 can be a singular display screen or multiple display screens for stereoscopic display. In certain embodiments, display 255 is a heads up display (HUD). The display 255 can include two screens, where each screen corresponds to an eye of the user (both the left eye and the right eye), and each screen displays content to the user.

The memory 260 is coupled to the processor 240. Part of the memory 260 can include a random access memory (RAM), and another part of the memory 260 can include a Flash memory or other read-only memory (ROM).

The memory 260 can include persistent storage (not shown) that represents any structure(s) capable of storing and facilitating retrieval of information (such as data, program code, or other suitable information on a temporary or permanent basis). The memory 260 can contain one or more components or devices supporting longer-term storage of data, such as a ready only memory, hard drive, flash memory, or optical disc.

Electronic device 200 further includes one or more sensor(s) 265 that can meter a physical quantity or detect an activation state of the electronic device 200 and convert metered or detected information into an electrical signal. For example, sensor 265 can include one or more buttons for touch input, a camera, an optical sensor, a gesture sensor, an inertial/motion sensors (such as a gyroscope or gyro sensor and an accelerometer), an air pressure sensor, a magnetic sensor or magnetometer, a grip sensor, a proximity sensor, altimeter, a color sensor, a bio-physical sensor (such as a heart rate sensor), a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor(s) 265 can also include various cameras such as a red green blue (RGB) camera, a dynamic vision sensor (DVS) camera, a 360° camera, or a combination thereof. The sensor(s) 265 can further include a control circuit for controlling at least one of the sensors included therein. The sensor(s) 265 can be used to determine an orientation and facing direction, as well as geographic location of the electronic device 200. Any of these sensor(s) 265 can be disposed within the electronic device 200, within a headset configured to hold the electronic device 200, or in both the headset and electronic device 200, such as in embodiments where the electronic device 200 includes a headset.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more an eye tracking processors, and the like. Also, while FIG. 2 illustrates the electronic device 200 configured as a mobile telephone, tablet, smartphone, or HMD, the electronic device 200 can be configured to operate as other types of mobile or stationary devices. For example, electronic devices and servers can come in a wide variety of configurations and FIG. 2 does not limit this disclosure to any particular electronic device or server.

Figure 3:
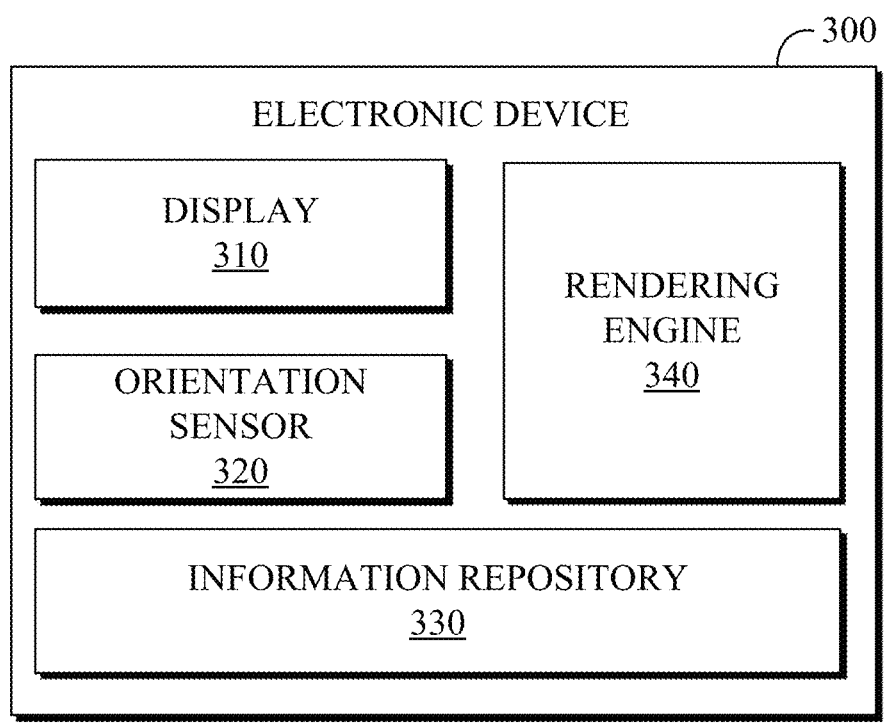
FIG. 3 illustrates an example block diagram of an electronic device in accordance with an embodiment of this disclosure.

FIG. 3 illustrates an example block diagram of an electronic device 300 in accordance with an embodiment of this disclosure. The embodiment of the electronic device 300 shown in FIG. 3 is for illustration only. Other embodiments can be used without departing from the scope of the present disclosure.

The electronic device 300 illustrates a high-level overview of an embodiment of the present disclosure. The electronic device 300 can be configured similar to any of the one or more client devices 106-115 of FIG. 1, and can include internal components similar to that of electronic device 200 of FIG. 2. For example, electronic device 300 can be similar to the HMD 115 of FIG. 1, as well as a desktop computer (similar to the desktop computer 106 of FIG. 1), a mobile device (similar to the mobile device 108 and the PDA 110 of FIG. 1), a laptop computer (similar to the laptop computer 112 of FIG. 1), a tablet computer (similar to the tablet computer 114 of FIG. 1), and the like.

In certain embodiments, the electronic device 300 is worn on the head of a user as part of a helmet, glasses, a visor, such as HMD 115. The electronic device 300 can display VR, AR, or MR, or a combination thereof. The electronic device 300 includes a display 310, an orientation sensor 320, an information repository 330, and a rendering engine 340.

The electronic device 300 can be a single device or multiple devices. For example, the electronic device 300 can be affixed to a stand or brackets and worn by the user. Alternatively, the electronic device 300 can be connected to a wearable display device, such that processing is performed at the electronic device (and can include the information repository 330 and the rendering engine 340), and the display device includes both the display 310 and the orientation sensors 320. If the electronic device 300 detects that it is affixed to a stand or brackets, or worn by the user, the electronic device 300 can determine whether to operate in the AR, VR, or MR mode. The electronic device 300 can receive an input from the user instructing the electronic device 300 to enter the AR VR, or MR mode.

In certain embodiments, the electronic device 300 can be a HMD (such as the HMD 115 of FIG. 1) that generates an AR environment in which a real-world environment is rendered with augmented information. In certain embodiments, the electronic device 300 can generate a VR environment a MR environment an AR environment, or any combination thereof. The electronic device 300 can be a goggle set for displaying an AR, VR, or MR environment. The electronic device can include a reflective display.

When the electronic device 300 is operating in a AR mode various functions related to the operation of AR are performed. For example, an AR functions can include loading at least on AR program. Another AR functions can include determining whether there is particular information to display based on a detected event, as well as whether a particular application is to run based on a detected event. Similar functions can be performed related to both VR and MR environments.

The display 310 is similar to the display 255 of FIG. 2. In certain embodiments, the display 310 is a standalone display affixed to the electronic device 300 via brackets. For example, display 310 is similar to a display screen on mobile device, or a display screen on a computer or tablet. In certain embodiments, the display 310 includes two screens, for a stereoscopic display, by providing a single display for each eye of a user. In certain embodiments, the display is an additive screen, a transparent LCD, a visor, or the like. An additive screen generally does not display the color black as an additive screen projects light. Therefore black pixels on an additive display can appear transparent. In certain embodiments, light can be projecting onto a visor and reflected towards the user, projected on to a display for the user to view, or structured light can be emitted into the retina of the user, and the like.

In certain embodiments, the display 310 is a transparent display, such as see through glasses, allowing the user to see the real world through the display 310. The electronic device 300 can completely replace the FOV of a user with the display 310 depicting a simulated visual component. The display 310 and can render, display or project content to be viewed by a user of the electronic device 300.

The display 310 can be a see-through display that enables the user to view both the real world and objects rendered and displayed or projected onto the display 310. The display 310 can switch between a VR mode to a see-through mode. For example, the display 310 can display an immersive environment displaying both a background and foreground objects. The display 310 can then enter a see-through mode such that the display 310 is transparent enabling a user to see through the screen to the real world.

The display 310 can be monocular or binocular and can be an opaque, transparent, semi-transparent, or a reflective device. For example, the electronic device 300 can be a monocular electronic device where the display 310 is a transparent screen. A user is able to see through the screen as well as able to see images rendered, projected, or displayed on the screen. The images may be projected onto the screen, generated or rendered by the screen or reflected on the screen. In another example, the electronic device 300 is a monocular electronic device where the display 310 is opaque or non-see through screen. For instance, if the display 310 is a non-see through screen, the display 310 can be a LCD, a LED, an AMOLED, or the like. The non-see through display can be configured to render images for viewing by the user. In another example, the electronic device 300 can be a binocular electronic device where the display 310 is a transparent screen. The transparent screen can be a single contiguous screen, such as adapted to be viewed by, or traverse across, both eyes of the user. The transparent screen also can be two transparent screens in when one screen is disposed corresponding to a respective eye of the user. The user is able to see through the transparent screen as well as able to see images rendered, projected, or displayed on the transparent screen. The images may be projected onto the transparent screen, generated or rendered by the transparent screen or reflected on the transparent screen. In another example, the electronic device 300 is a binocular electronic device where the display 310 is an opaque or non-see through screen. If the electronic device 300 is a binocular electronic device with an opaque display, the electronic device 300 can include a camera or camera input configured to capture real-world information and display, via the non-see through display screen, real-world information on the display 310. The non-see through display screen can be an LCD, LED, AMOLED, or the like. The non-see through display screen can be configured to render images for viewing by the user. The real-world information captured by the camera can be rendered as a video image on the display screen with augmented information.

There are different types of display elements that can be used and displayed on the display 310 in VR, AR, and MR (collectively extended reality (XR)) scenarios. For example, displayed elements are either tied directly to the real world or tied loosely to the XR display space on the display 310. In world elements are elements that move in relation to the real or virtual environment itself (i.e., move in relation to the environment itself). Depending on the object, in world elements may not necessarily move in relation to the user's head when wearing the electronic device 300, such as a HMD.

A HUD element is an virtual object wherein users can make small head movements to gaze or look directly at various application (app) elements without moving the HUD elements container or UI panel in the display view. HUD elements can be a status bar or UI by which information is visually displayed to the user as part of the display.

In certain embodiments, when a three-dimensional (3-D) image is implemented in the augmented reality mode, the electronic device 300 converts the information to fit the 3-D image. For instance, information being displayed in two dimensions (2-D) can be converted into left and right eye information corresponding to the 3-D image, and the converted information can then be synthesized and displayed on the display 310.

The orientation sensor 320 senses can be similar to the sensors 265 of FIG. 2. The orientation sensor 320 includes one or more sensors that sense motion of the electronic device 300. The motion can be caused by head movements of the user, when the electronic device 300 is worn as a HMD. The orientation sensor 320 provides for head and motion tracking of the user based on the position of the user's head. By tracking the motion of the user's head, the orientation sensor 320 allows the rendering engine 340 to simulate visual and audio components in order to ensure that, from the user's perspective, displayed items and sound remain consistent with the user's movements. The orientation sensor 320 can include various sensors such as an inertial sensor, an acceleration sensor, a gyroscope gyro sensor, magnetometer, and the like. For example, the orientation sensor 320, detects magnitude and direction of movement of a user with respect to the display 310. The orientation sensor 320 can detect when the electronic device 300 moves and allows the electronic device 300 to calculate the force of movement in a particular direction. By detecting the movements of the user with respect to the display, the viewpoint, or elements displayed on the display 310 to the user is dynamically changed. That is, the orientation sensor 320 allows a user to interactively change a viewpoint and dynamically view any part of the captured scene, by sensing movement of the user.

In certain embodiments, the orientation sensor 320 can also include a camera that captures image data of the sounding area of the electronic device 300. For example, the electronic device can have a front camera that faces the user when the user views the display 310 and a back camera that faces opposite the display, such as the real world. If the orientation sensor 320 includes a camera that faces the user, the camera can track the eye movement or the eye gaze of the user. The camera that faces the user and tracks the eye movement of the user can include two cameras such that one camera captures eye movement of the right eye and the second camera captures eye movement of the left eye. The camera can include one or more of a color camera (such as an red green blue (RGB) camera), a video camera, a depth camera, a motion sensor, radar, sonar, infrared (IR), and the like.

The orientation sensor 320 can also include a hand tracker that tracks the motion of the hand of the user. The hand can hold a controller that includes the hand tracker sensor. The hand tracker can be a camera affixed to the electronic device that monitors the movement of one or both hands of the user.

The information repository 330 can be similar to the memory 260 of FIG. 2. The information repository 330 represents any structure(s) capable of storing and facilitating retrieval of information (such as data, program code, or other suitable information on a temporary or permanent basis). The information repository 330 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc. The information repository 330 stores one or more 360° videos, metadata associated with the 360° video(s), priority systems associated with displayed elements, or a combination thereof. The priority systems associated with displayed elements can indicate which objects displayed on the display are to be faded. The information repository 330 can store data gathered by the orientation sensor 320 and the sensors 265 of FIG. 2. Additional data stored in information repository 330 can include state data based on the data gathered by the sensors, objects or elements displayed on the display 310, and the like.

The rendering engine 340 modifies elements or objects displayed on the display 310 by fading and unfading various virtual objects based on one or more factors. For example, the rendering engine 340 identifies a priority level that is associated with each object rendered, displayed, or projected on the display 310. The rendering engine 340 can then determine whether to fade or un-fade a virtual object based on an identified priority level. For example, the rendering engine 340 can compare the priority level of one object to the priority level of each object rendered on the display. The rendering engine 340 can then determine whether to fade or un-fade a virtual object based one or more relationships between the objects rendered on the display. Fading certain objects in an AR environment highlights the objects that are not faded.

In certain embodiments, the rendering engine 340 generates a gradient fading border that is applied to the perimeter of the display. The gradient border fades the edge of a virtual object that extends beyond the display 310. For example, the gradient border is generated by applying a texture that augments the display. In another example, the gradient border is applied post processing on a pixel by pixel basis. By fading the edge of the object that extends beyond the screen can increase awareness of the user that additional portions of the object can be moved in or out of the display 310.

In certain embodiments, the rendering engine 340 can tag one or more objects and brighten the tagged objects. Brightening tagged objects enables originally dark content to improve visibility. For example, on certain types of displays, a dark object when rendered on the display becomes transparent or semi-transparent based on the amount of black that is included in each pixel of the virtual object. By brightening a transparent or semi-transparent object can increase the visibility of the object to a user.

The rendering engine 340 can identify objects rendered on a display and fade one or more rendered elements to direct the attention of the user to a particular object. The fading of objects in a 3-D environment such as an AR environment, where virtual objects can be rendered to appear at different distances from the user can provide focus for certain virtual objects over other virtual objects as well as other real objects. For example, 3-D virtual objects can compete for user attention in the 3-D space that is projected over the real world. By fading particular virtual objects can direct the attention of the user to a specific virtual object. In certain embodiments, a priority system is used to determine particular objects to fade. The priority system enables the rendering engine 340 to identify rules and relationships between two or more virtual objects displayed on the display 310.

In certain embodiments, the rendering engine 340 determines whether to fade a displayed virtual object. When multiple objects are displayed on the display, the rendering engine 340 identifies which of the objects to fade and can prevent the user from interacting with the object. Additionally, the rendering engine 340 identifies which of the objects are not faded. In certain embodiments, a virtual object that is faded can become transparent or semi-transparent, whereas an object that is not faded or in focus is opaque.

Virtual objects can overlap as certain virtual objects can be fixed to a particular area of the display, 310, pinned to an object in the real world, or displayed momentarily such as a notification. The rendering engine 340 can fade non-selected or inactive objects as well as highlight the in-focus elements to reduce overlap confusion. The rendering engine 340 identifies when two or more displayed virtual objects overlap. In certain embodiments, when no objects occupy the same area of the display 310, such that the objects do not overlap, the rendering engine 340 does not alter the virtual objects. When two or more objects occupy the same space on the display 310, such that the objects overlap, the rendering engine 340 can determine which object to fade and bring the background of the non-faded object. For example, the object that is in focus is rendered in front of any faded objects.

Figure 4B:
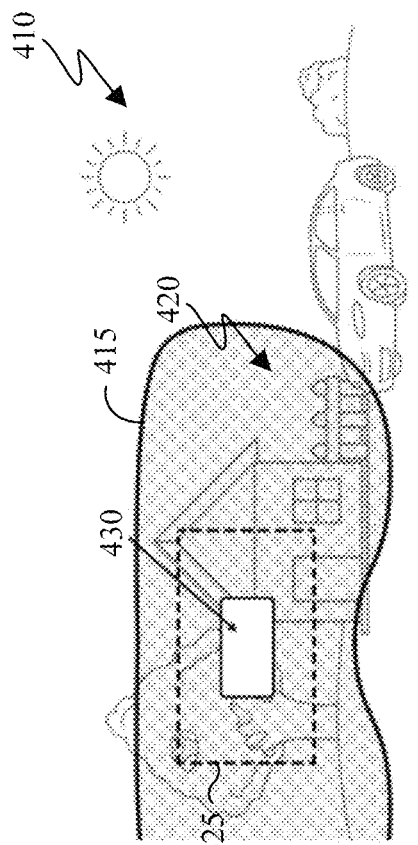
FIGS. 4A, 4B, 4C, and 4D illustrate an example view through a head mounted display and the real world external to the head mounted display in accordance with an embodiment of this disclosure.
Figure 4A:
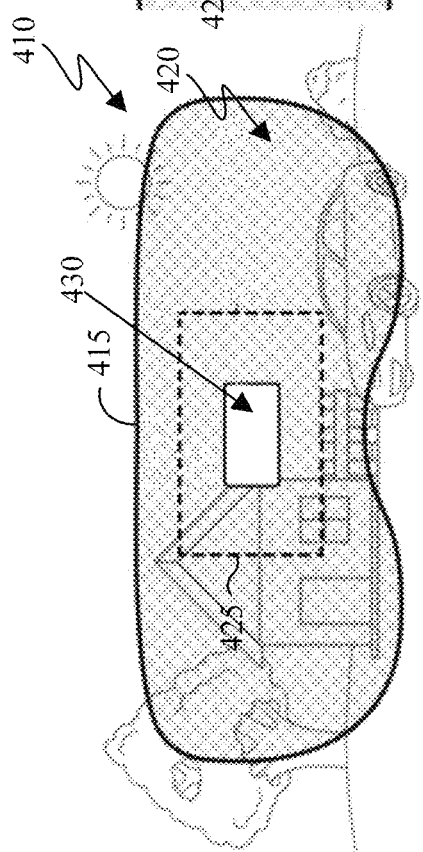
Figure 4D:
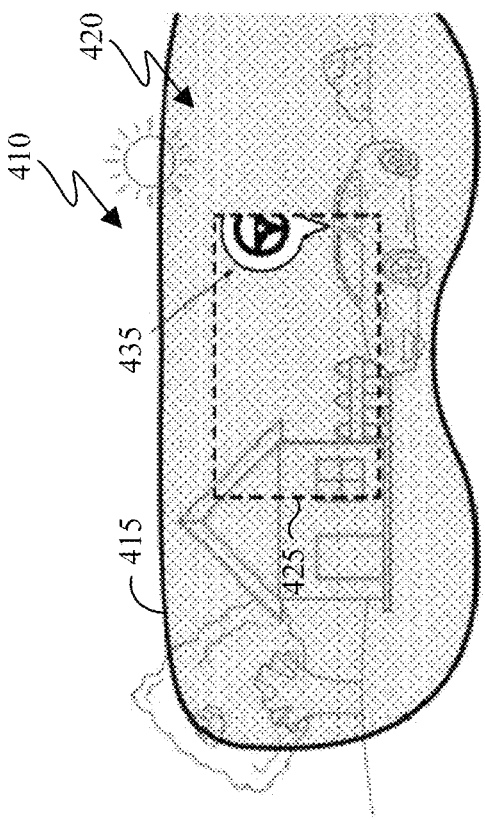
Figure 4C:
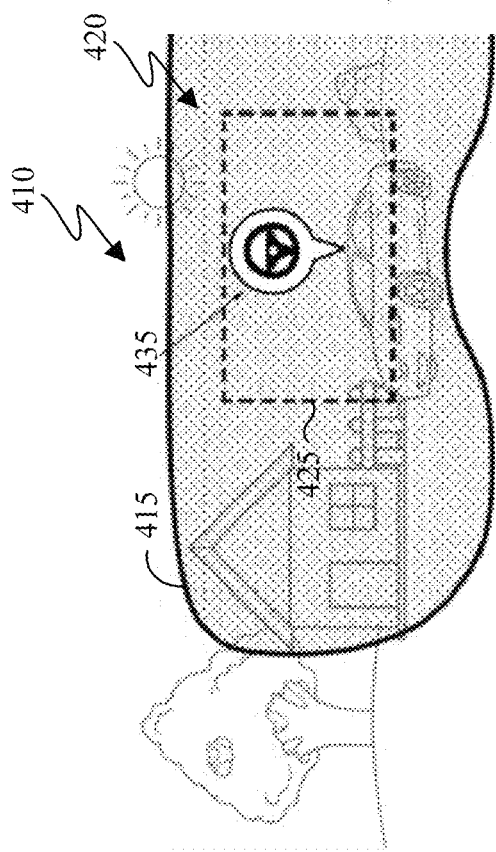

FIGS. 4A, 4B, 4C, and 4D illustrate an example view through a HMD and the real world external to the HMD in accordance with an embodiment of this disclosure. In particular, FIGS. 4A and 4B illustrate a HUD element, and FIGS. FIGS. 4C and 4D illustrate a pinned element. The HMD 415 can be similar to the electronic device 300 of FIG. 3 and any of the client devices 106-115. The HMD 415 can include internal components similar to that of the electronic device 200 of FIG. 2. The embodiments shown in FIGS. 4A, 4B, 4C, and 4D are for illustration only. Other embodiments can be used without departing from the scope of the present disclosure.

The FIGS. 4A, 4B, 4C, and 4D illustrate a view through a HMD 415 and viewing the real world 410. The real world 410 is the real world when seen outside or external to the HMD 415. The HMD 415 includes lens 420 that include a display area 425. In certain embodiments, lens 420 is transparent or semi-transparent. The lens 420 allows a user to view both the real world 410 and the lens 420 as the lens is transparent or semi-transparent. The display area 425 and can be similar to the display 255 of FIG. 2 and the display 310 of FIG. 3. The display area 425 can display virtual objects that overlay the real world as seen through the lens 420. In certain embodiments, the lens 420 is similar to the display 255 of FIG. 2 and the display 310 of FIG. 3. The lens 420 depicts the real world 420 as seen within the HMD 415.

FIGS. 4A and 4B illustrate a HUD element 430. The HUD element 430 is a virtual object that remains in the same position of the display area 425. For example, as the user turns the HMD 415 from a first position, as illustrated in FIG. 4A, to a second position, as illustrated in FIG. 4B, the HUD element remains in the same position.

FIGS. 4C and 4D illustrated a pinned element 435. The pinned element 435 is a virtual object that is pinned to an object in the real world. That is, the pinned element 435 remains pinned to the same spot in the real world regardless if the user turns the HMD 415 to a new location. For example, as the user turns the HMD 415 from a first position, as illustrated in FIG. 4C, to a second position, as illustrated in FIG. 4D, the pinned element is partially cut off of the display area 425.

Figure 5B:
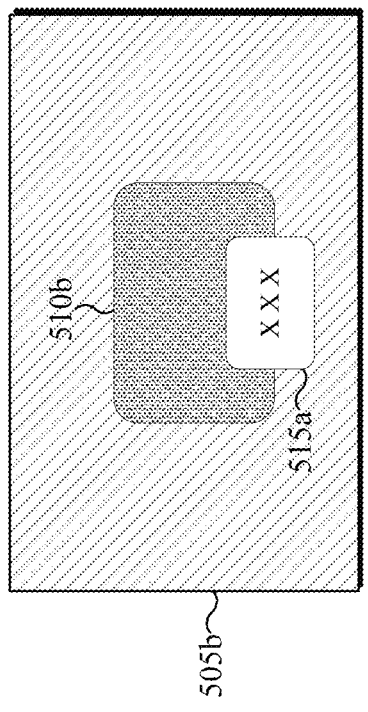
FIGS. 5A, 5B, and 5C illustrate an example display displaying various virtual objects in accordance with an embodiment of this disclosure.
Figure 5A:
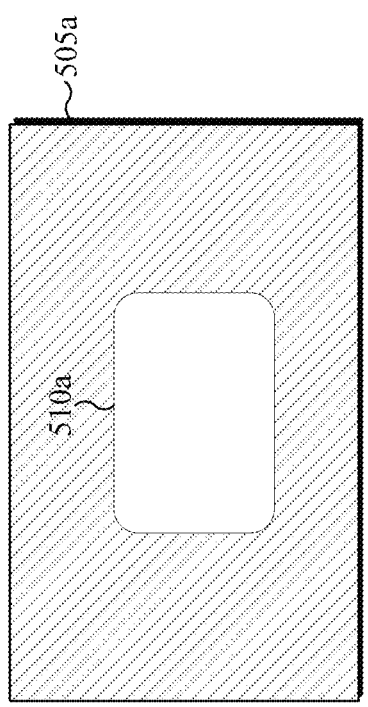
Figure 5C:
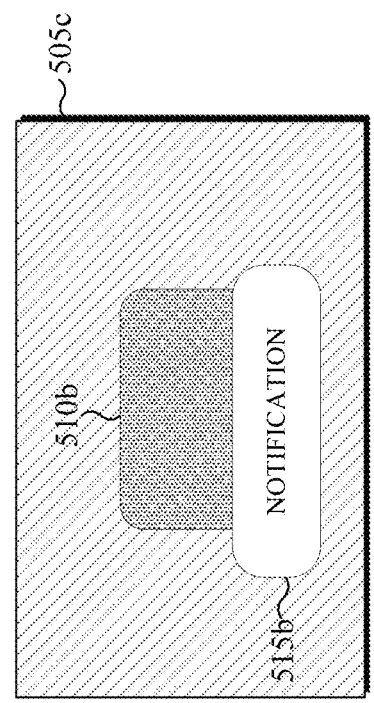

FIGS. 5A, 5B, and 5C illustrate an example display displaying various virtual objects in accordance with an embodiment of this disclosure. The FIGS. 5A, 5B, and 5C depict display 505a, 505b, and 505c, respectively. The displays 505a, 505b, and 505c, can be the display 255 of FIG. 2, the display 310 of FIG. 3, and the display area 425 of the FIGS. 4A-4D. The displays 505a, 505b, and 505c, as illustrated in FIGS. 5A, 5B, and 5C, respectively, illustrate the same image at different time intervals. The embodiment as shown in the FIGS. 5A, 5B, and 5C are for illustration only. Other embodiments can be used without departing from the scope of the present disclosure.

The FIGS. 5A, 5B, and 5C illustrate an object in focus while fading or brining another object out of focus. For example, an object can be brought into focus or faded out of focus based on a preset or predefined priority system. In another example, an object can be brought into focus or faded out of focus based on the eye gaze of the user by tracking the eye (or eyes) of the user. In another example, an object can be brought into focus or faded out of focus based on a received input such as from a controller, a touchpad, voice control, and the like. Bringing a virtual object out of focus can include making the virtual objet object fade or become semi-transparent, while bringing a virtual object into focus can include making the virtual object opaque.

FIG. 5A illustrates the display 505a displaying a virtual object 510a. The virtual object 510a is in focus and the user is able to view and interact with the object. FIG. 5B, an indicator 515a appears on the display 505b. The indicator 515a can suddenly appear on the display 505b and partially overlap the virtual object 510b that becomes transparent, due to the presence of the indicator 515a. That is, the indicator 515a is a newly displayed virtual object that is displayed while the virtual object 510a is displayed. When the indicator 515a appears on the display 505b, the virtual object 510a is faded as illustrated by the virtual object 510b. It is noted that the indicator 515a is not selected as an active element that would allow the user to interact with the indicator 515a. Even though the indicator 515a is not selected, the virtual object 510b is faded. The virtual object 510b is faded in order to provide the user the ability to determine whether to select the indicator 515a in order to interact with the indicator 515a, or dismiss the indicator 515a and return the virtual object 510b to the selected state (such as the virtual object 510a of FIG. 5A).

FIG. 5C illustrates notification 515b as selected object on the display 505c. That is, the indicator 515a of FIG. 5B is selected and the notification 515b is displayed in place of the indicator 515a. The notification 515b becomes the element of focus and is the only element on the screen that the user can interact with. The user can interact with the notification 515b until the user dismisses the notification 515b from the display 505c. When the user dismisses the notification 515b from the display 505c, the virtual object 510b, currently faded, reverts to the selected position such as the virtual object 510a of FIG. 5A. For example, when the user dismisses the notification 515b, the virtual object 510a once again becomes the element of focus.

FIGS. 6A, 6B, 6C, and 6D illustrate an example display displaying various virtual objects in accordance with an embodiment of this disclosure. The FIGS. 6A, 6B, 6C, and 6D depict display 605a, 605b, 605c, and 605d respectively. The displays 605a, 605b, 605c, and 605d, can be the display 255 of FIG. 2, the display 310 of FIG. 3, and the display area 425 of the FIGS. 4A-4D. The displays 605a, 605b, 605c, and 605d (collectively 605) as illustrated in FIGS. 6A, 6B, 6C, and 6D, respectively, illustrate the same image at different time intervals. In certain embodiments, the display 605 is a head mounted display, and changes the content displayed based on user eye gaze and head movement. The embodiment as shown in the FIGS. 6A, 6B, 6C, and 6D are for illustration only. Other embodiments can be used without departing from the scope of the present disclosure.

The FIGS. 6A, 6B, 6C, and 6D illustrate determining whether an object is in focus or faded based on the eye gaze or direction of the eye focus of the user. For example, the FIGS. 6A, 6B, 6C, and 6D illustrate a user interface flow a HUD element 610a and 610b (collectively 610), similar to the HUD element 430 of FIGS. 4A and 4B occupies the same space on the display as with a pinned element 615a and 615b (collectively 615), similar to the pinned element 435 of FIGS. 4C and 4D.

Figure 6B:
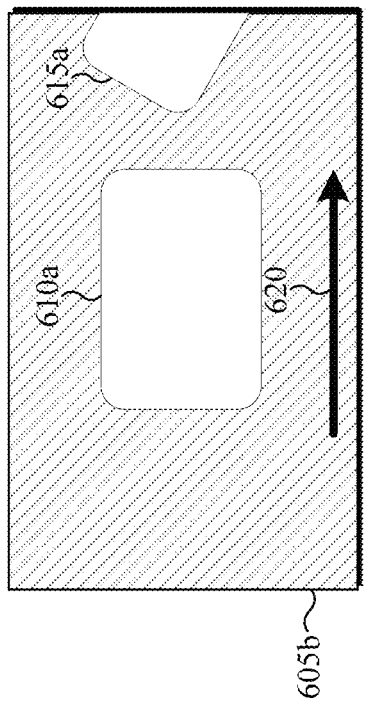
FIGS. 6A, 6B, 6C, and 6D illustrate an example display displaying various virtual objects in accordance with an embodiment of this disclosure.
Figure 6D:
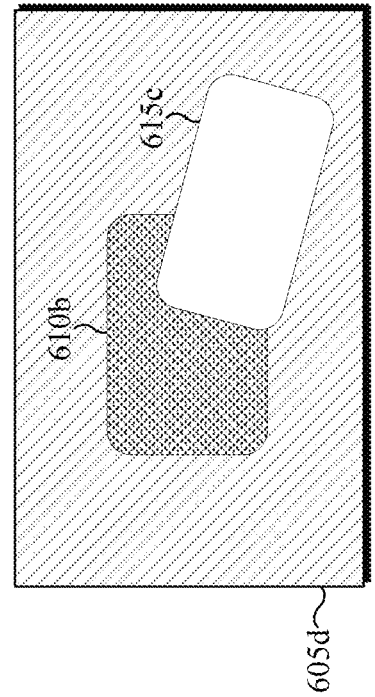
Figure 6A:
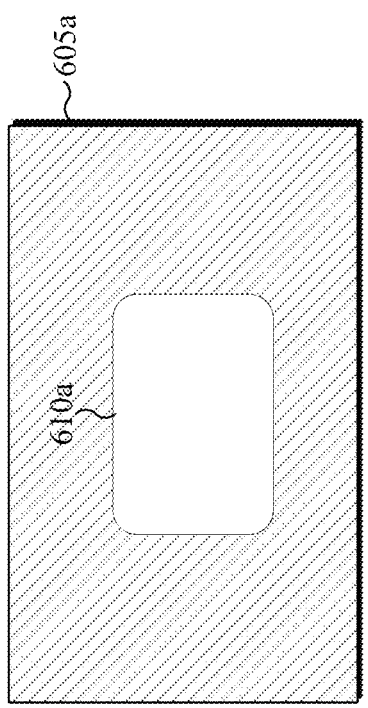

FIG. 6A illustrates the display 605a displaying a HUD element 610a. The HUD element 610a is a virtual object that is in a fixed position relative to the display. That is, if display 605a is moved through the environment, displayed the HUD element 610a is in a fixed position even if different virtual objects are displayed. FIG. 6B illustrates the display 605b moving in the direction as indicated by the arrow 620. As the user directs the display 605 in the direction of the arrow 620 a pinned element 615a appears on the display 605b. Both the HUD element 610a and the pinned element 615a are in focus.

Figure 6C:
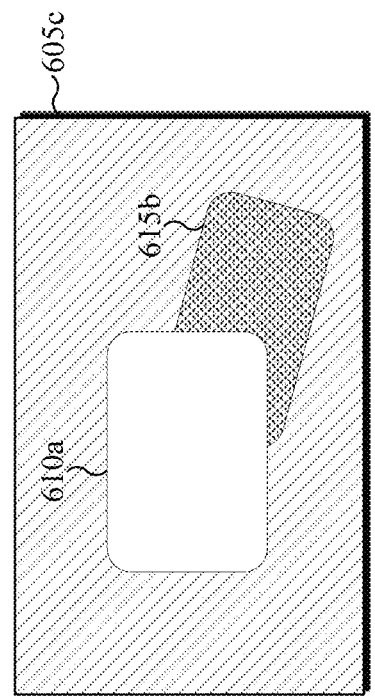

FIG. 6C illustrates the HUD element 610a and the pinned element 615b overlapping. HUD element 610a is in focus and the pinned element 615b is faded, while FIG. 6D illustrates the pinned element 615c in focus and the HUD element 610b is faded. In certain embodiments, the user can select either the HUD element 610 or the pinned element 615 as the selected object by a user input or eye tracking. In FIG. 6C, the HUD element 610a is the selected object, such that the HUD element 610a is the only element in focus and is the only element on the display 605 that the user can interact with. In contrast, FIG. 6D, the pinned element 615c is the selected object, such that the pinned element 615c is the only element in focus and is the only element on the display 605 that the user can interact with. When the HUD element 610 and the pinned element 615 overlap, depending on which object the user is viewing (or selected by a user input), the viewed or selected object is brought to the foreground, and the object in the background is faded. For example, the HUD element 610a is in front of pined object 615b in FIG. 6C, and pinned element 615c is in front of the HUD element 610b in FIG. 6D. In certain embodiments, the focused object, (such as the HUD element 610a, the pinned element 615a and 615c) is opaque allowing the user to fully view the object, while the faded objects (such the HUD element 610b and the pinned element 615b) are faded but remain in view allowing the user to select the faded object bringing it into focus.

Figure 7A:
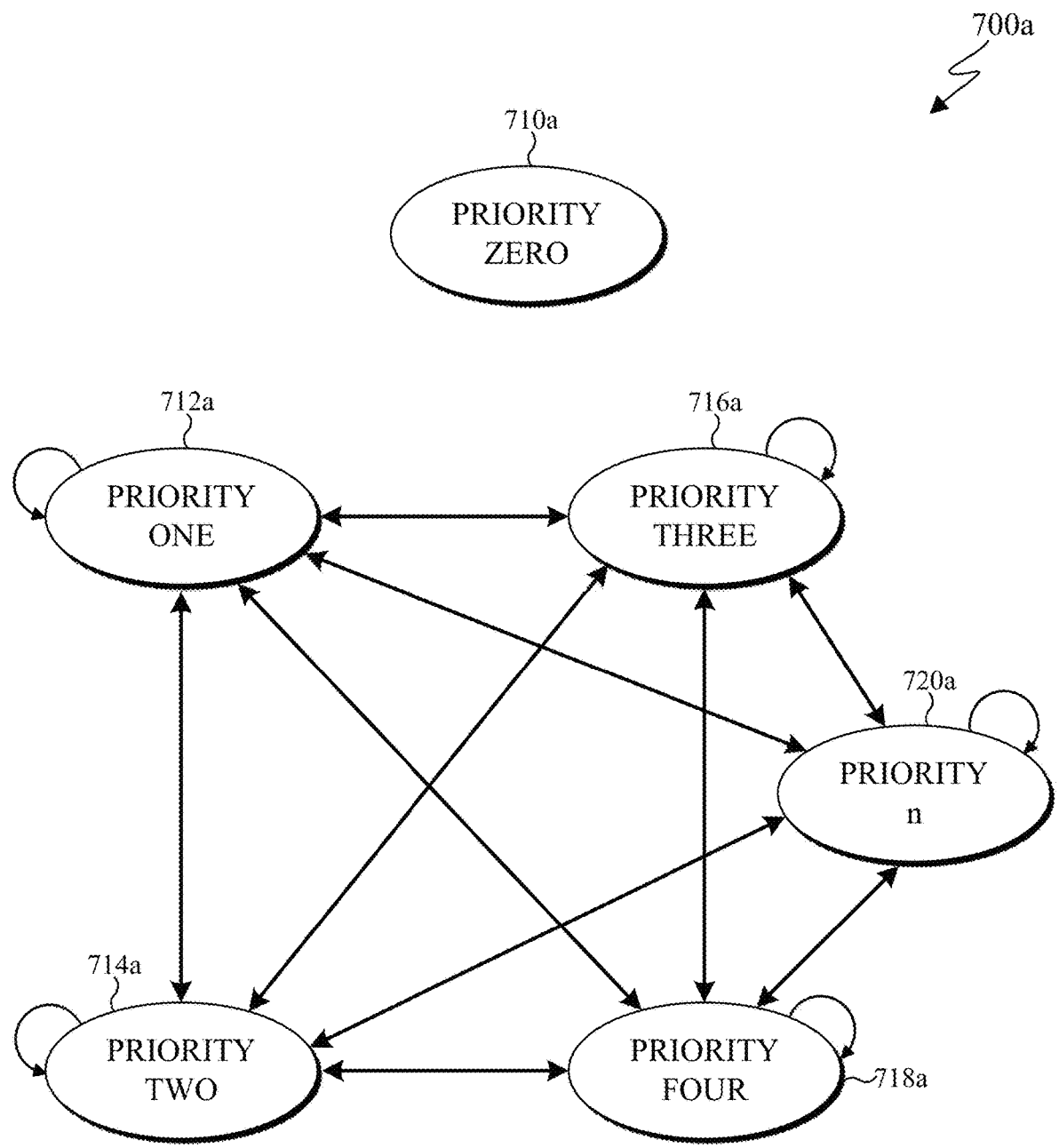
FIGS. 7A, 7B, and 7C illustrate an example priority system illustrating relationships between different objects and priorities in accordance with an embodiment of this disclosure.
Figure 7B:
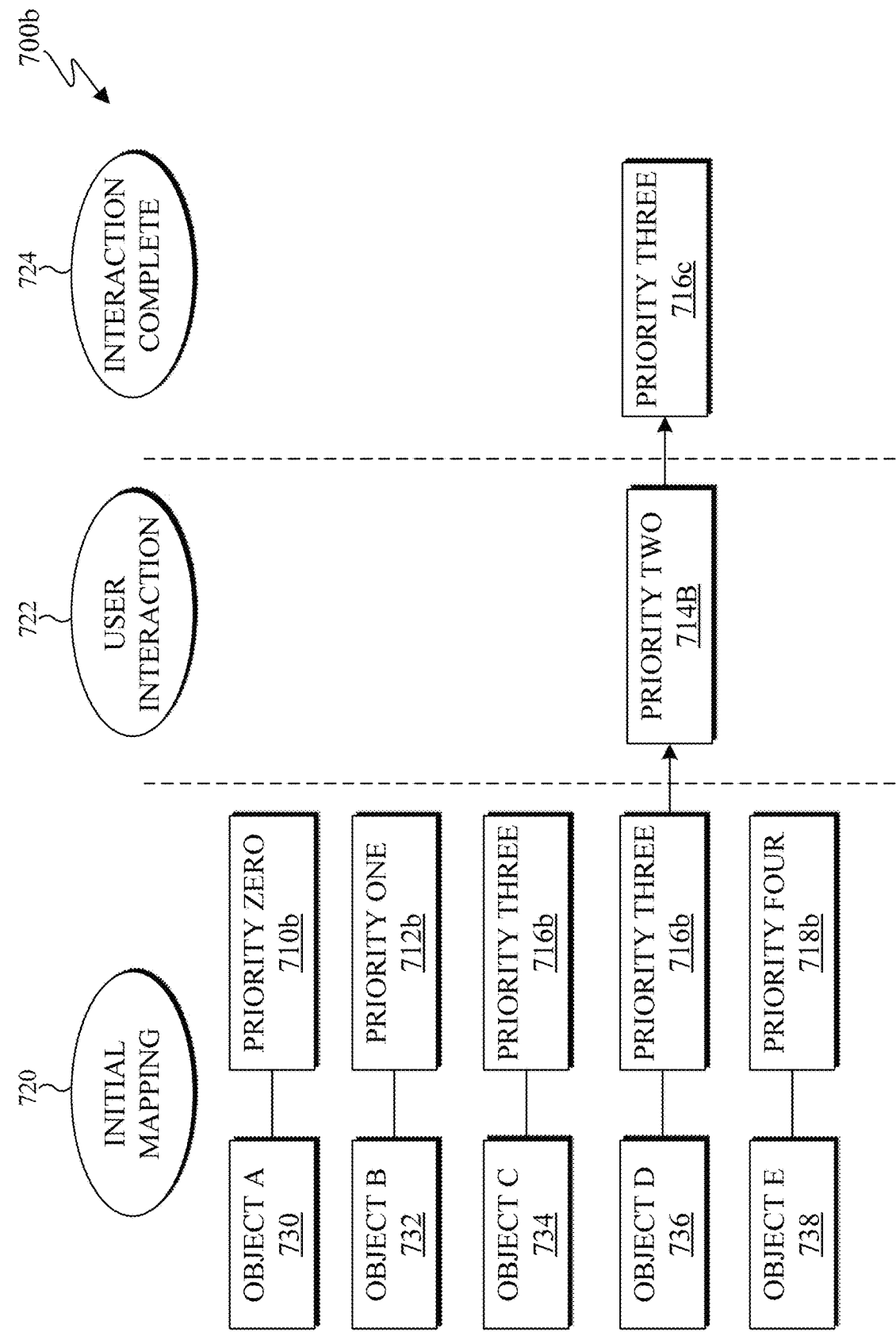
Figure 7C:
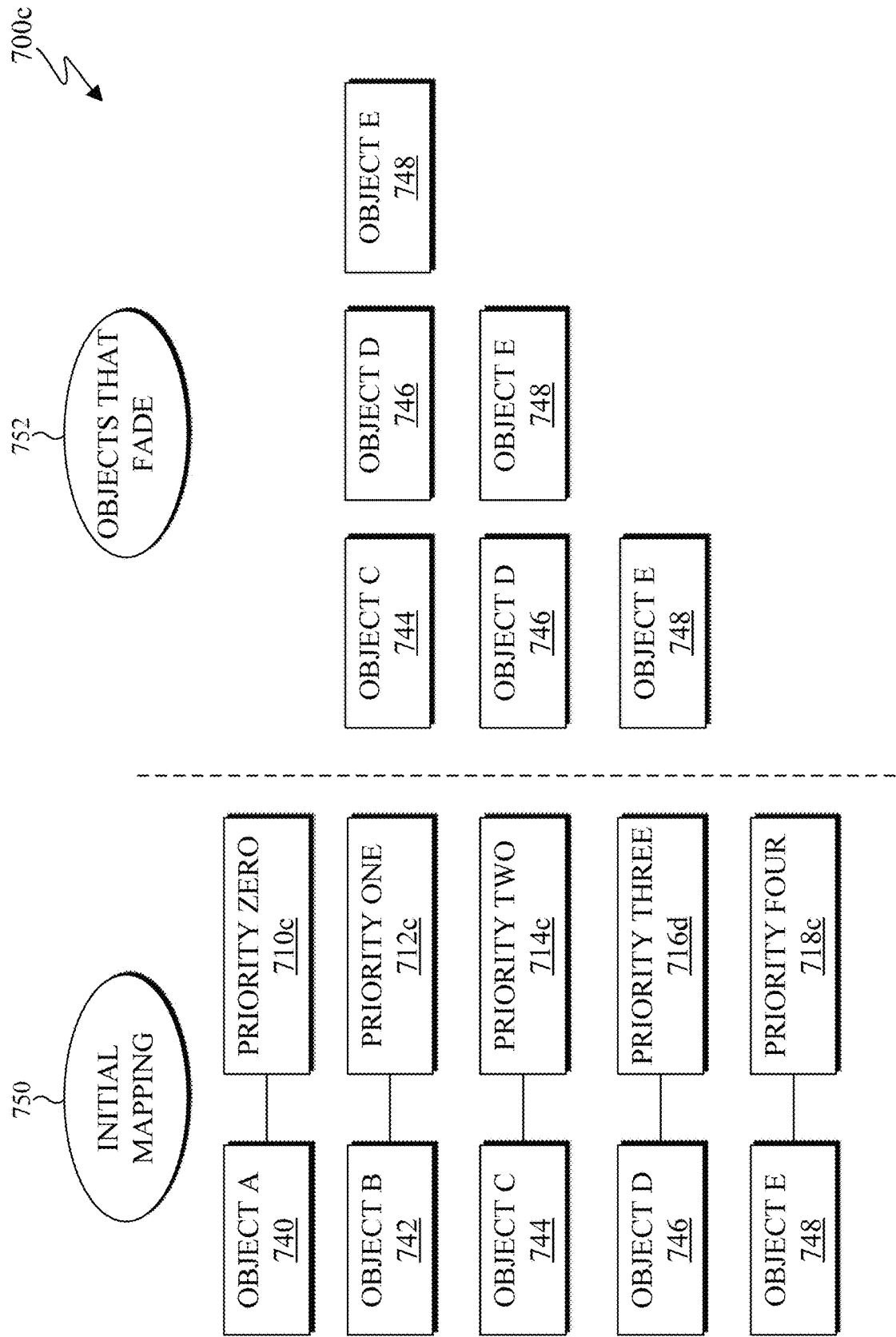

FIGS. 7A, 7B, and 7C illustrate an example priority system illustrating relationships between different objects and priorities in accordance with an embodiment of this disclosure. In particular, FIG. 7A illustrates a web 700a depicting how particular priority levels interacts with other priority levels. FIG. 7B illustrates an example priority system 700b depicting relationships between objects of different priority levels when an object is interacted with in accordance with an embodiment of this disclosure. FIG. 7C illustrates an example priority system 700c depicting a hierarchical relationship between objects of differing priority levels in accordance with an embodiment of this disclosure. The web 700a depicts relationships between priority levels whereas the priority system 700b and the priority system 700c depict how objects with different priorities relate to each other and the ability to change a priority associated with an object when the object is interacted with.

The priority system of FIGS. 7A, 7B, and 7C are priority networks that are applied to objects rendered on the display, such as the display 255 of FIG. 2 and the display 310 of FIG. 3. For example, the web 700a illustrates relationships between any priority level and any other priority level. The priority system 700b illustrates an example embodiment of an initial priority value that is associated with an object can change when that object is interacted with. The priority system 700c illustrates an example embodiment of how objects assigned with a particular priority level interact in a hierarchical scheme with other objects of the same or different priority level, based on the properties of the levels shown in the web 700a. For example, the web 700a depicts relationships between different priority levels and how a priority level is changed on a user interaction or an occurrence of an event with respect to various other priority levels. The priority system 700B depicts an example of priorities of an object changing when an object is interacted with. The priority system 700C depicts an embodiment of a priority scheme with priorities associated with each object and how objects are modified, and can take precedence over objects of differing priorities. That is, priority system 700c illustrates how an object that is assigned a particular priority level is affected by a particular priority level that is assigned another object. The embodiment as shown in the FIGS. 7A, 7B, and 7C are for illustration only. Other embodiments can be used without departing from the scope of the present disclosure.

User interface objects, such as virtual objects, can be set to different priority levels, where each priority level has different relationship to each other. Additionally, objects with different priority levels interact based on various predefined criteria. For example, objects can fade, become opaque, move to the foreground, move to the background, based on whether an objects collides with another object, is interacted with by a user, or an object with a certain priority level appears or is removed from the FOV of the user. That is, the different priority levels provide control over how the different virtual objects respond to each other.

Assigning different priority levels to various virtual objects, defining the interaction of how objects with different the priorities levels interact with each other, and defining how priority levels that is associated with an object can change when that object is interacted with are customizable. In certain embodiments, priority levels can be established by different users or entities. For example, a platform developer can set priority levels associated with particular virtual objects. In another example, a third party developer can set priority levels associated with particular virtual objects. In another example, the user of the electronic device, such as the electronic device 300, can set priority levels associated with particular virtual objects. Using different priority levels provides a custom user experience by directing the rendering engine 340 to fade and un-fade particular virtual objects.

The web 700a depicts of priority zero 710a, priority one 712a, priority two 714a, priority three 716a, priority four 718a, and priority n 720a. The priority n 720a can represent any number of additional priority levels. The priority system 700b depicts a similar a priority system of the web 700a of FIG. 7A. In particular, priority system 700b includes objects that are assigned various priorities from the priority web 700a. For example, the priority zero 710b is a different instance of the priority zero 710a of FIG. 7A. In another example, the priority one 712b is a different instances of the priority one 712a of FIG. 7A. In another example, the priority three 716b and priority three 716ci are different instances of the priority three 716a of FIG. 7A. In another example, the priority four 718b is a different instances of the priority four 718a of FIG. 7A.

In certain embodiments, more or less priorities can be applied to the virtual objects. For example, a three tier priority system can include a first priority level, a second priority level, and a third priority level. The first priority level can include any virtual object that remains in focus until that object is dismissed. Any object on the display that does not have a first priority level, is faded when an object that includes a first priority level appears on the display. In certain embodiments, an object with a first priority level can include notifications, elements that are the user is currently interacting with, such as if the user picks up a virtual object and moves it to a new location. The second priority level can include objects that remain in focus when intersecting or overlapping other user interface objects. The third priority level can include objects that are designated as not to be prioritized. Such objects fade when any object with a higher priority is rendered on the display.

The priority web 700a depicts priority zero 710a, priority one 712a, priority two 714a, priority three 716a, priority four 718a, and priority n 720a. Certain priority levels (such as, priority one 712a, priority two 714a, priority three 716a, priority four 718a, and priority n 720a) can interact with itself or another priority level. For example, two object s that are assigned a priority one 712a collide or intersect one another. In another example an object that is assigned a priority one 712a can collide or intersect with an object that is assigned a priority three 716a. Depending on how the priority levels are established determines the outcome of the interaction between the objects that collide or intersect.

In certain embodiments, when priority zero 710a is assigned to an object, that object that is not affected by any priority level of the web 700a (such as priority one 712a, priority two 714a, priority three 716a, priority four 718a, and priority n 720a). For example, priority zero 710a can be applied to any object that does not fade or become more opaque as other virtual objects enter or exit the display. A priority zero 710a level can be applied to a button associated on a tracked controller. That is, an object designated with a priority zero 710a level is not affected by nor does a virtual object with a priority zero 710a affect any other virtual object on the display.

In contrast to the priority zero 710a, the priorities 712a, 714a, 716a, 718a, and 720a are related to one another. For example, when an object with any the level other than priority zero 710a appears on the display, that object or another object of a different priority level other than priority zero 710a is affected and can be modified.

For example, when a priority one 712a level that is assigned to an object is rendered on the display, any object with a priority two 714a, priority three 716a, priority four 718a, through priority n 720a, is faded. That is, all other objects with a priority level other than the priority one 712a will fade if an object with a priority one 712a is rendered on the display. Example virtual objects with a priority one 712a level can include an application notification, a system notification, a system menu, and the like.

A priority two 714a is assigned to a virtual object that the user is currently interacting with. Interacting with can include an object that the user is looking or manipulating, or both. In certain embodiments, a priority two 714a can cause a lower priority (e.g. 716a, 718a, and 720a) to fade when the two objects intersect or overlap, and the second object is a lower priority (e.g. 716a, 718a, and 720a). For example, a priority two 714a indicates that the object is currently being interacted with and will cause a lower priority element to fade only a priority two element intersects (overlaps and occupies the same area on the display as a lower priority object). An object with a priority two 714a is a default priority three 716a. That is, the priority of the virtual object is increased, from a priority three 716a to a priority two 714a, when the user interacted with the object. When the user stops interacting with the object (or switches to interact with another object), the priority of the object decreases from the priority two 714a to the objects default priority of priority three 716a. In certain embodiments, when the user stops interacting with the object the priority of the object remains a priority two 714a permanently or for a predetermined period of time.

In certain embodiments, a user can interact with two or more objects at the same time, causing both objects to become a priority two 714a. When two or more objects that are a priority two 714a intersect, the objects can collide into each other. That is, when both objects collide, both objects are opaque and a portion of one object overlaps a portion of the other object. For example, an object with a priority two 714a level that is moved into another object with a priority two 714a is given a marginally higher priority such that it is brought to the front and blocks a portion of the stationary priority two 714a object. In another example, the object that is rendered and displayed closer to the user is positioned in front of and blocks the object that is further from the user, regardless of which object was moved into the other object.

An object with a priority three 716a can become a priority two 714a when the user is interacting with the object. For example, if the rendering engine 340 receives a state data of the electronic device 300 that indicates the user is viewing a virtual object with a priority three 716a, the priority of the virtual object increases to a priority two 714a. The received state data can also include a user input on a controller. A priority three 716a object can cause a lower priority object (e.g., 718a and 720a) to fade when the two objects intersect or overlap. A priority two 714a can indicate an object that the user is interacting with, or viewing. In certain embodiments, a priority three 716a can indicate a default priority.

An object with a priority four 718a is be faded when any object with a higher priority (e.g., 710a, 712a, 714a, 716a, 718a, and 720a) intersect it. An object with a priority four 718a can include an external object such as a sign as displayed through a public interfacing protocol. Public interfacing protocol includes external objects and public information concerning the real world.

The priority n 720a can represent one or more additional priority levels that can be associated with virtual objects. In certain embodiments, the priority n 720a includes a priority level that is associated with an object that is displayed for a limited quantity of time. For example, an object with a priority n 720a level is displayed on the display for a predetermined period of time unless the user interacts with the object. When the predetermined period of time elapses, the object fades completely such that it is removed from the display entirely. In certain embodiments, the priority n 720*a* represents two or more additional priority levels, with each priority level including unique parameters that vary how the objects associated with each priority level interacts with another object. That is, the priority n 720*a* is a continuing set of priority levels up to a predetermined number. In certain embodiments, the web 700*a* does not include the priority n 720*a* level. The timer can reset each time the user manipulates or interacts with the virtual object with this type of priority, such that the time limit is extended and allows the virtual object to continue to be displayed on the display.

In certain embodiments, another priority system based on the web 700*a* is based on the following parameters. A priority zero 710*a* applied to an object that is not affected by any priority level of the web 700*a* (such as priority one 712*a*, priority two 714*a*, priority three 716*a*, priority four 718*a*, and priority n 720*a*). When two objects with the same priority intersect or collide with each other, the opacity of either object does not change. A priority one 712*a* level can cause an object to always be displayed in a particular manner. For example, when an object with a priority one 712*a* level is rendered on the display, the object always opaque. A priority two 714*a* can cause an object associated therewith to become opaque when it collides or intersects with an object with a predetermined priority. For example, when an object that is associated with a priority two 714*a*, intersects or collides with an object that includes a priority level of priority three 716*a*, a priority four 718*a*, or a priority n 720*a*, the object that is associated with a priority two 714*a*, can become opaque. All objects rendered on the display can default to a priority five, such as priority n 720*a*. A priority five can become a priority two 714*a* if the object that is associated with the priority five is grabbed or selected by the user. Similarly, a priority five can become a priority three 716*a* if the object that is associated with the priority five is looked at by the user. For example, if the electronic device displays a priority five object that the user is gazing, then that priority of that object is modified to become a priority three 716*a*, and the object is then modified according to the parameters associated with the priority three 716*a* level. A priority two, 714*a*, a priority three 716*a* or a priority five can be modified and become a priority four 718*a* when an object associated with one of the priorities (priority two, 714*a*, a priority three 716*a*, or a priority five) is grabbed by the user and the user is gazing at the object.

FIG. 7B illustrates the priority system 700*b* depicting an object changing priority based on a user interaction of the object. The priority system 700*b* is based on the priority web 700*a*. An object can change priority based on different factors other than those described with respect to the priority system 700*b*.

The priority system 700*b* includes three stages, an initial mapping 720 stage, a user interaction 722 stage, and an interaction complete 724 stage. The initial mapping 720, is the initial configuration of assigning various objects to various priority levels. The various objects are object A 730, object B 732, object C 734, object D 736, and object E 738. More or less objects can be used. The priority levels that are initially assigned to each object can be based on the same or different priorities of the FIG. 7A.

Object A 730 is assigned priority zero 710*b*. That is, when object A 730 is rendered on the display, the object A 730 is not faded regardless of any other objects rendered on the display. Object B 732 is assigned priority one 712*b*. That is, when object B 732 is rendered on the display, the object B 732 causes any other object rendered on the display (except for object A 730) to fade. Object C 734 and object D 736 are both assigned priority three 716*b*. As discussed above, an object that is assigned a default priority, such as the priority three 716*a*, the priority is modified to become a priority two 714*a* when a user interacts with the object. As a result, when a user interacts with object D 736 in the user interaction 722 stage, the priority of the object is modified to become priority two 714*b*. When the user is done interacting with the object D 736 in the interaction complete 724 stage, the object D 736 reverts back to priority three 716*c*. In certain embodiments, when the user is done interacting with the object D 736 in the interaction complete 724 stage, the object D 736 remains priority two 714*b*. Additionally, since the object C 734 is not interacted with in the user interaction 722 stage, the priority three 716*b*, is not modified. Object E 738 is assigned priority four 718*b*. That is, the object E 738 will fade when the object A 730 or the object B 732 appear on the display. Also, the object E 738 will fade when the object E 738 overlaps all or a portion of the object D 736 (when object D 736 is a priority two 714*b*) such as when the user is interacting with the object D 736. Assigning the priority levels to the objects can be performed prior to an object being rendered on the display.

FIG. 7C illustrates the priority system 700*b* depicting an example hierarchical priority scheme. An object assigned a certain priority level interacts differently with an object of a different priority level. Based on the how one priority interacts with another priority, the priority system 700*c* depicts the effects of when objects of different priorities interact with each other.

The priority system 700*c* includes two stages, an initial mapping 750 stage, objects that fade 752 stage. The initial mapping 720, is the initial configuration of assigning various objects to various priority levels. For example, the object A 740 is assigned priority zero 710*c*. The priority zero 710*c* is similar to the priority zero 710*a* of FIG. 7A and priority zero 710*b* of FIG. 7B. The object B 742 is assigned priority one 712*c*. The priority one 712*c* is similar to the priority one 712*a* of FIG. 7A and priority one 712*b* of FIG. 7B. The object C 744 is assigned priority two 714*c*. The priority two 714*c* is similar to the priority two 714*a* of FIG. 7A and the priority two 714*b* of FIG. 7B. The object D 746 is assigned a priority three 716*d*. The priority three 716*d* is similar to the priority three 716*a* of FIG. 7A and the priority three 716*b* and 716*c* of FIG. 7B. The object E 748 is assigned a priority four 718*b*. The priority four 718*b* is similar to the priority four 718*a* of FIG. 7A and the priority four 718*b* of FIG. 7B.

When object A 740 is rendered on the display, any other object (such as, object 742, object C 744, object D 746, and object E 748) rendered on the display is not modified. Similarly, when object A 740 is rendered on the display with another object A 740 or any other object (such as, object 742, object C 744, object D 746, and object E 748), the object A 740, is not modified. Object A 740 is not modified the assigned priority of priority zero 710*b* is not affected by any other priority level.

When object B 742 is rendered on the display, and the object C 744, the object D 746 or the object E 748 (or a combination thereof) is rendered on the display, then those objects that are rendered are faded. That is, the object B 742 causes all other objects of a lower priority (such as, the priority two 714*c*, the priority three 716*d*, and the priority four 714*c*) to fade or be modified.

When object C 744 is rendered on the display, and the object D 746 or the object E 748 (or a combination thereof)

is rendered on the display, then those objects that are rendered are faded or modified. That is, the object C 744 causes all other objects of a lower priority (such as, the priority three 716*d* and priority four 714*c*) to be modified. The object C 744 can be modified by the object B 742.

When object D 746 and the object E 748 is rendered on the display, then the object E 748 that is faded. That is, the object D 746 causes all other objects of a lower priority (such as, priority four 714*c*) to be faded or modified. The object D 746 can be modified by the object B 742 or the object C 744.

Object E 748 is the lowest priority and does not cause any other object to be modified. Object E 748 can be modified by the object B 742, the object C 744 or the object D 748.

FIGS. 8A, 8B, 8C, 8D, 8E, and 8F illustrate an example display depicting various augmented reality objects based on an example priority system in accordance with an embodiment of this disclosure. FIGS. 8B, 8C, 8D, 8E, and 8F illustrate AR environment 800*b*, 800*c*, 800*d*, 800*e*, and 800*f* (collectively 800), respectively. The AR environment 800*a* depicts an example real world view through a display (such as the display 310 of FIG. 3), whereas the AR environment 800 depicts an example real world view through a display as well as various virtual objects. The virtual objects depicted in the AR environment 800 are based on the web and priority system 700*a*, 700*b*, and 700*c* of FIGS. 7A, 7B, and 7C. The embodiment as shown in the FIGS. 8A, 8B, 8C, 8D, 8E, and 8F are for illustration only. Other embodiments can be used without departing from the scope of the present disclosure.

Figure 8A:
FIGS. 8A, 8B, 8C, 8D, 8E, and 8F illustrate an example display depicting various augmented reality objects based on an example priority system in accordance with an embodiment of this disclosure.

FIG. 8A depicts the real world, with no virtual objects. For example, if the electronic device 300 of FIG. 3 is a HMD, where the display 310 is transparent, the user views the real world and not virtual objects are rendered on the display 310. The AR environment 800*a* depicts a calendar 801*a* affixed to a wall of the real world and a desk 801*b*.

Figure 8B:
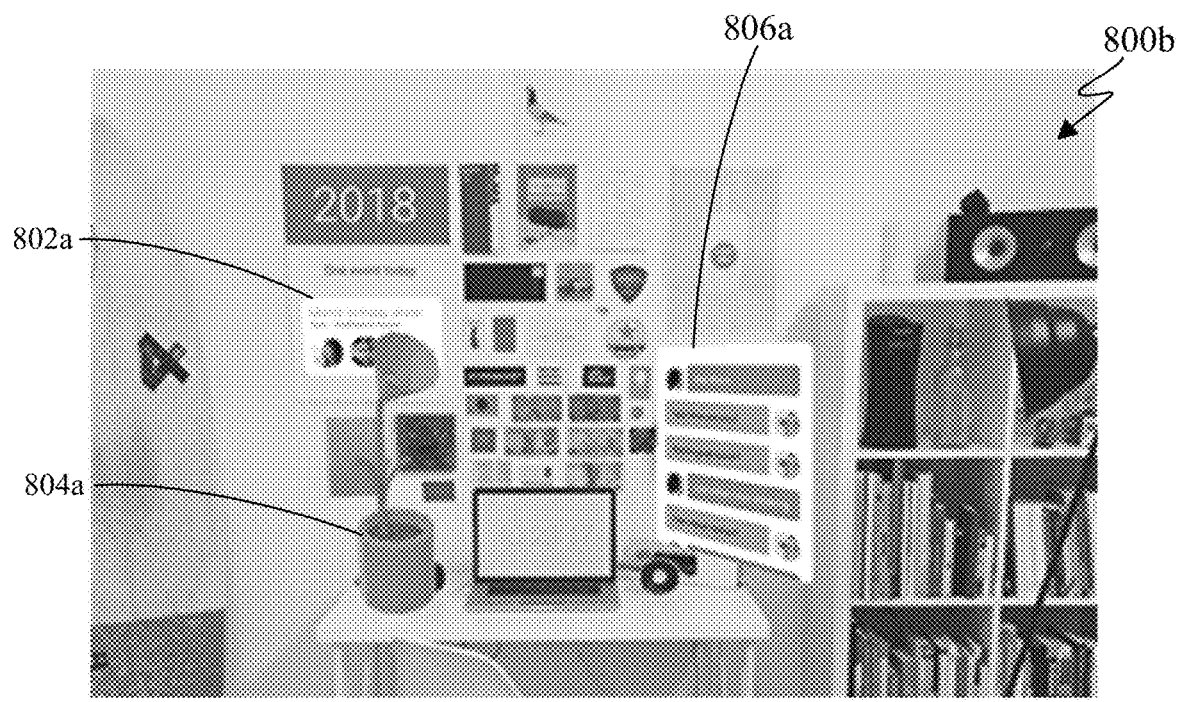
Figure 8D:
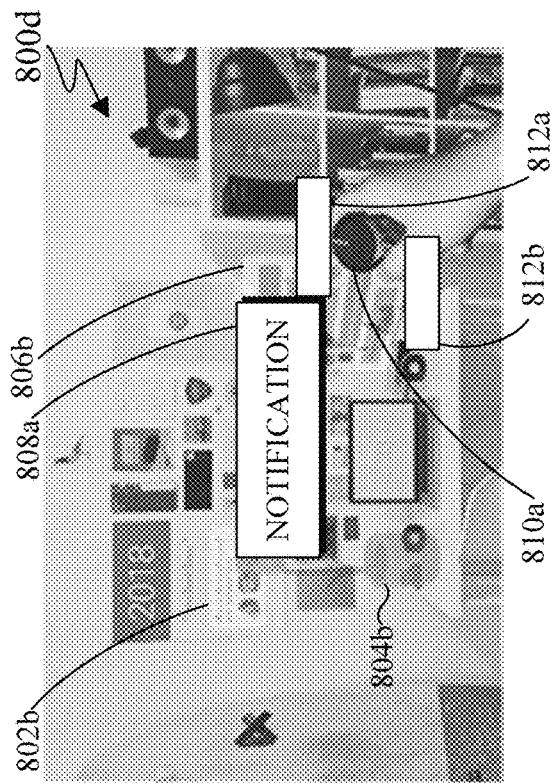
Figure 8F:
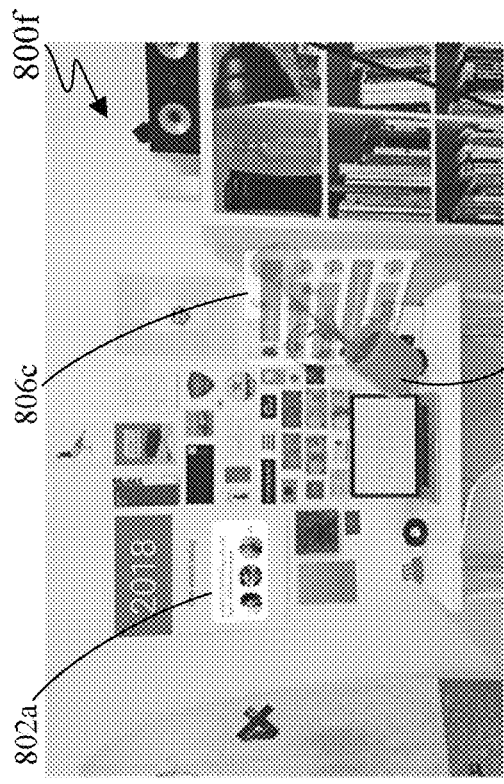
Figure 8C:
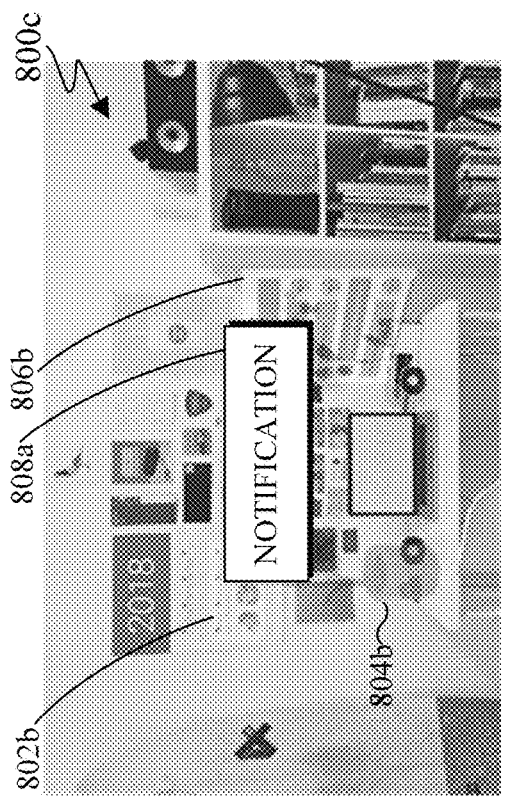
Figure 8E:
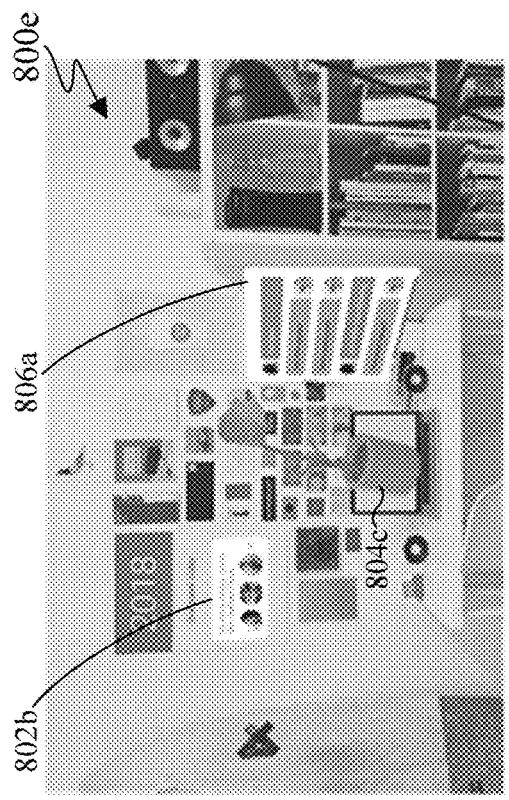

FIG. 8B illustrates AR environment 800*b* displaying the real world of FIG. 8A with several virtual objects. That is, AR environment 800*b* illustrates the AR environment 800*a* after the electronic device 300 of FIG. 3 activates the display 310 to render, project or display three virtual objects. The virtual objects of the AR environment 800*b* are a calendar event 802*a*, a flower 804*a*, and a messaging application 806*a*. The calendar event 802*a* is pinned to the calendar 801*a* of FIG. 8A. Using the priority scheme of FIG. 7A, the calendar event 802*a*, the flower 804*a*, and the messaging application 806*a* are given a priority three 716. The priority three 716*a* is the default priority for the calendar event 802*a*, the flower 804*a*, and the messaging application 806*a*. Each virtual object (the calendar event 802*a*, the flower 804*a*, and the messaging application 806*a*) is opaque and fully visible to a user. For example, a priority three 716*a* will fade or become transparent when a virtual object that includes a priority one 712*a* appears on the display, or a priority two 714*a* overlaps a virtual object with a priority three 716*a* level.

In certain embodiments, any of the displayed virtual objects (such as the calendar event 802*a*, the flower 804*a*, and the messaging application 806*a*) can be assigned a different priority value. For example, if the calendar event 802*b* is assigned a priority one 712*a*, (and the flower 804*a*, and the messaging application 806*a* are priority three 716*a*) then the flower 804*a*, and the messaging application 806*a* are faded or become transparent. A virtual object assigned to a priority three 716*a* will fade when a priority one 712*a* is rendered, projected or displayed.

FIGS. 8C, 8D, 8E, and 8F illustrate the AR environments 800*c*, 800*d*, 800*e*, and 800*f*, respectively. The AR environ-ments 800*c*, 800*d*, 800*e*, and 800*f* depict the real world of FIG. 8A with several virtual objects where the priority level of the virtual objects change based on different events.

For example, AR environment 800*c* depicts notification 808*a* in addition to the virtual objects of the AR environment 800*b*. The notification 808*a* can be a notification associated with an application stored on the electronic device 300, a system notification, or a system menu. The rendering engine 340 identifies that the notification 808*a* has a priority one 712*a* level since to the notification 808*a* is a notification or menu. The virtual objects (the calendar event 802*a*, the flower 804*a*, and the messaging application 806*a*) of the AR environment 800*b* remain the priority three 716*a* level. However, in the AR environment 800*c*, the virtual objects of the AR environment 800*b* are faded due to the presence of a priority one 712*a* in the same FOV. For example, the calendar even 802*a* is faded to become calendar event 802*b*. Similarly, the flower 804*a* is faded to become the flower 804*b*, and the messaging application 806*a* becomes messaging application 806*b*. That is, when a priority one 712*a* element is rendered in the AR environment, any virtual object with a priority level other than priority zero 710*a* is faded.

The AR environment 800*d* illustrates the same AR environment as 800*c* but includes the hand of the user that is grasping a controller 810*a*. The rendering engine 340 identifies the controller 810*a* and determines that the priority level of the controller 810*a* is a priority zero 710*a*. A priority zero 710*a* is not affected by nor affects any object with another priority level. When the controller 810*a* is moved to the FOV of the user in the real world, dialog boxes 812*a* and 812*b* are rendered on the display and assigned a priority zero 710*a* level as the dialog boxes 812*a* and 812*b* are dependent on the controller 810*a* being within the FOV of the user. Therefore, the dialog boxes 812*a* and 812*b* and the notification 808*a* are opaque as these virtual objects are not affected by each other. In contrast, the calendar event 802*b*, the flower 804*b*, and the messaging application 806*b*, remain a priority three 716*a* level and are faded or semi-transparent, an object with a higher priority (such as the notification 808*a*) is rendered on the display.

In certain embodiments, the rendering engine 340 determines whether to modify the priority level of the virtual objects. The rendering engine 340 detects when the user is interacting with one of the virtual objects. In response to the rendering engine 340 detecting that the user is interacting with one of the virtual objects, the rendering engine 340 determines whether to modify the priority level of the object that the user is interacting with. For example, the AR environment 800*e* illustrates the user moving the flower 804*a* of FIG. 8B, and as a result, the rendering engine 340 modifies the priority level of the 804*a* of FIG. 8B. The flower 804*c* is the same as the flower 804*a* of FIG. 8B. For example, both the flower 804*c* and the flower 804*a* are opaque. Since the user is interacting with the flower 804*c*, the priority level of the flower is modified from a priority three 716*a* to a priority two 714*a*. A virtual object with a priority two 712*a* level fades any other virtual object of a lower priority that is intersected by the virtual object. Since the flower 804*c* does not intersect with the calendar event 802*a* or the messaging application 806*a*, all the virtual objects are at a normal opacity level.

If the flower 804*c* is moved to intersect or overlaps either the calendar event 802*a* or the messaging application 806*a*, then that object is faded and brought to the background behind the flower 804*c*. For example, the AR environment 800*f*, illustrates the flower 804*c* (a priority two 714*a* level)

overlapping the messaging application 806c (a priority three 716a level). The messaging application 806c is a faded version of the messaging application 806a. The messaging application 806c can have the same or different opacity level as that of the messaging application 806b. For example, the transparency level of a virtual object can be different based on the relationship to other virtual objects. For instance, if an object with a priority one 712a is rendered on the display, the lower priority object can be faded to a predetermined threshold. Alternatively, if a virtual object with a priority three 716a is rendered on the display, and is overlapped by a virtual object with a priority two 714a, the transparency level of the virtual object with the priority three 716a can be faded to a second predetermined threshold.

Figure 8G:
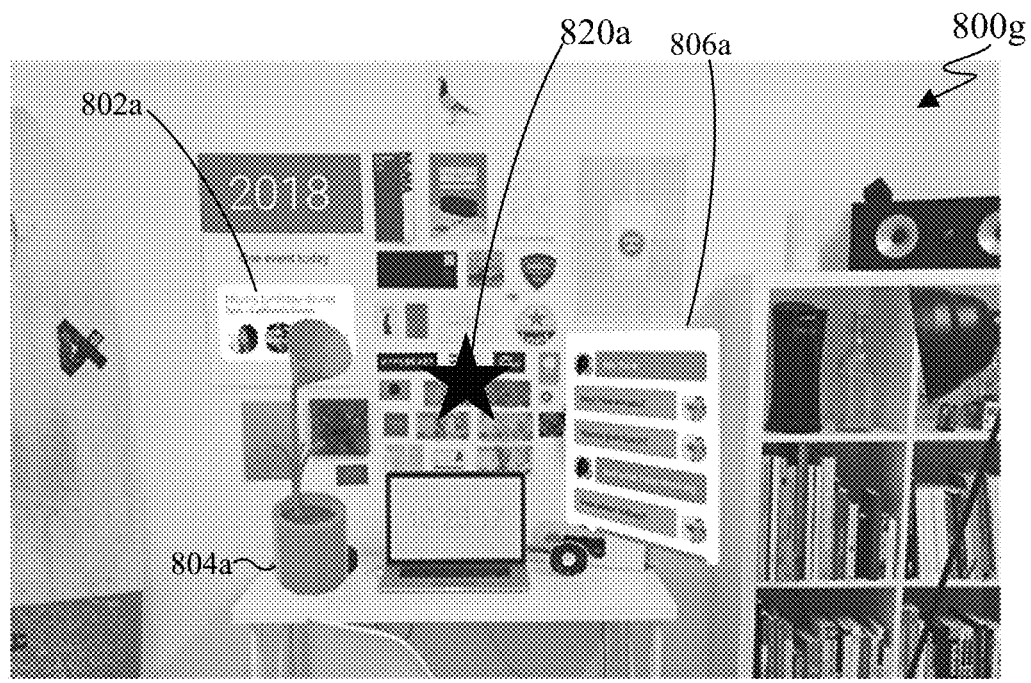
FIGS. 8G and 8H illustrate an example display depicting various augmented reality objects based on an example priority system and an eye tracking system in accordance with an embodiment of this disclosure.
Figure 8H:
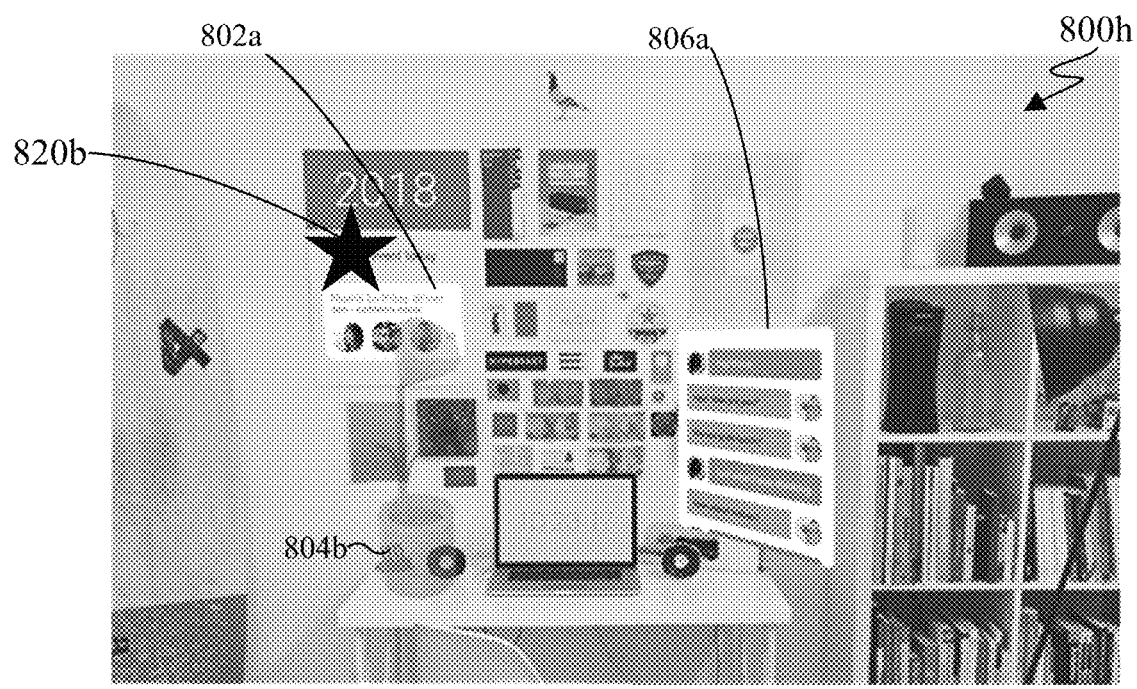

FIGS. 8G and 8H illustrate an example display depicting various augmented reality objects based on an example priority system and an eye tracking system in accordance with an embodiment of this disclosure. FIGS. 8G and 8H illustrate AR environment 800g and 800h, respectively. The AR environments 800g and 800h depict the AR environment 800 of FIGS. 8B-8F. In particular the AR environments 800g and 800h depict real world view through a display as well as various virtual objects. For example, the AR environments 800g and 800h are viewed through a HMD such as the electronic device 300 of FIG. 3. In certain embodiments, the electronic device 300 includes an eye tracking feature that tracks one or both eyes of the user. The rendering engine 340 then modifies the rendered virtual objects based on the detected eye gaze of the user.

The AR environment 800g is similar to the AR environment 800b. For example, the electronic device 300 of FIG. 3 activates the display 310 to render, project or display three virtual objects. The virtual objects of the AR environment 800b are a calendar event 802a, a flower 804a, and a messaging application 806a. Using the priority scheme of FIG. 7A, the calendar event 802a, the flower 804a, and the messaging application 806a are given a priority three 716. For example, a priority three 716a will fade or become semi-transparent when a virtual object with a priority one 712a appears on the display. Additionally, a priority three 716a will fade or become semi-transparent when a virtual object with a priority two 714a overlaps the virtual object with the priority three 716. Eye gaze 820a represents the current location on the display 310 that the eyes of the user are focusing on. When the eye gaze 820a is not focused on any of the virtual objects, the virtual objects are opaque and visible to the user, and remain a priority three 716.

When the eye gaze of the user shifts from the eye gaze 820a position of the AR environment 800g to the eye gaze 820b position of the environment 800h, the eye gaze 820b focuses on the calendar event 802a. When the eye gaze 820b of the user focuses on the calendar event 802a, the priority of the calendar event changes from the priority three 716a level to the priority two 714a level. The priority level of the flower 704b and the messaging application 706a (as illustrated in FIG. 8H) remain at the priority three 716a level. The flower 804a, of FIG. 8G, is modified and becomes the flower 804b of FIG. 8H is overlapped by a virtual object with a priority two 712a. For example, the flower 804b is a priority three 716a level while the calendar event 702a is a priority two 714a level (in response to the eye gaze 820b of the user). Due to the eye gaze 820b of the user that causes the rendering engine 340 to change the priority level of the calendar event 802a, the rendering engine 340 determines to modify and fade the flower 804b. When the user views the calendar event 802a, as depicted by the eye gaze 820b, the rendering engine changes the calendar element from a priority three 716a to a priority two 714a. Thereafter the rendering engine 340 identifies priority three 716a elements (the flower 804b and the messaging application 806a) and determines whether to modify the appearance of the priority three elements, by comparing the priority level of the priority three 716a elements to any virtual object that includes a higher priority level, such as the calendar event 802a. The defined relationship between a priority two 714a and a priority three 716a object is defined, and the rendering engine 340 determines to modify any priority three elements that overlap with a priority two 714a object. In certain embodiments, the flower 804b becomes semi-transparent but remains in front of the calendar event 802a when the flower is pinned to the table 801b as illustrated in FIG. 8A. In certain embodiments, the flower 804b becomes semi-transparent and positioned behind calendar event 802a.

FIGS. 9A, 9B, and 9C, illustrate an example HMD depicting various augmented reality objects based on an example priority system in accordance with an embodiment of this disclosure. FIGS. 9A, 9B, and 9C are similar to that of the FIGS. 4A, 4B, 4C, and 4D and depict a view through a HMD 915 in accordance with an embodiment of this disclosure. The HMD 915 can be similar to the HMD 415 of FIGS. 4A, 4B, 4C, and 4D, electronic device 300 of FIG. 3 and any of the client devices 106-115. The HMD 915 can include internal components similar to that of the electronic device 200 of FIG. 2. The embodiments shown in FIGS. 9A, 9B, and 9C are for illustration only. Other embodiments can be used without departing from the scope of the present disclosure.

The FIGS. 9A, 9B, and 9C illustrate a view through a HMD 915 and viewing the real world 910. The real world 910 is the real world when seen outside or external to the HMD 915. The HMD 915 includes lens 920 that include a display area 925. In certain embodiments, lens 920 is transparent or semi-transparent. The lens 920 allows a user to view both the real world 910 and the display 925 as the lens is transparent or semi-transparent. The display area 925 and can be similar to the display area 425 of FIGS. 4A, 4B, 4C, and 4D, the display 255 of FIG. 2 and the display 310 of FIG. 3.

FIGS. 9A, 9B, and 9C illustrates HUD element 930. The HUD element 930 is similar to the HUD element 430 of FIGS. 4A and 4B. The HUD element 930 is a virtual object that remains in the same position of the display area 925. FIGS. 9B and 9C illustrate a pinned element 935a and 935b, respectively. The pinned element 935a and 935b (collectively 935) represent the same virtual object, but the pinned element 935a is opaque while the pinned element 935b is faded. The pinned element 935 is similar to the pinned element 435 of FIGS. 4C and 4D. That is, the pinned element 935 remains pinned to the same spot in the real world regardless if the user turns the HMD 915 to a new location.

The FIGS. 9A, 9B, and 9C illustrate a chronological sequence. Using the priority scheme of FIGS. 7A, 7B, and 7C, the HUD element 930 is a priority two 714a and the pinned element 935 is a priority three 716. For example, in FIG. 9A, the user views both the real world 910 through the HMD 915 and the HUD element 930 within the display area 925. When the user shifts the HMD 915, as shown in FIG. 9B, the pinned element 935a is rendered and displayed in addition to the HUD element 930. The pinned element 935a and the HUD element 930 are both opaque as the both virtual objects do not overlap, even though the HUD element 930 is a priority two 712a and the pinned element 935a is a priority three 716. When the virtual objects overlap, as shown in FIG. 9C, the rendering engine 340 modifies the pinned element 935a (of FIG. 9B) to the pinned element 935b. The HUD element 930 intersects the area of the display area 925 where the pinned element 935 is positioned. The HUD element 930 remains opaque and the pinned element 935a is faded as represented by the pinned element 935b of FIG. 9C. The pinned element 935b is faded and is moved behind the HUD element 930, since the HUD element 930 has a higher priority than the pinned element 935b.

Figure 10:
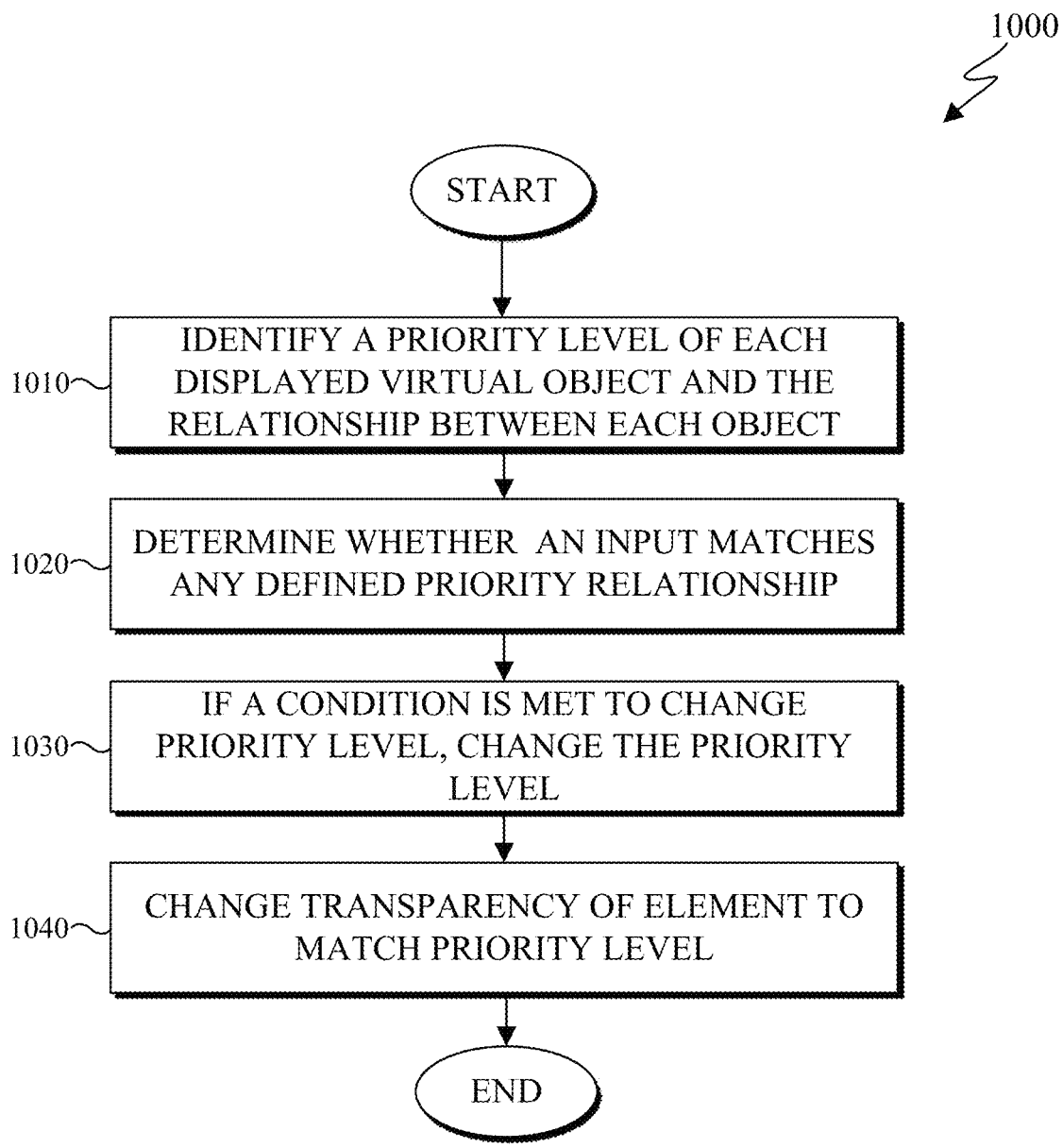
FIG. 10 illustrates a method for fading virtual objects displayed on an electronic device in accordance with an embodiment of this disclosure.

FIG. 10 illustrates a method 1000 for fading virtual objects displayed on an electronic device in accordance with an embodiment of this disclosure. FIG. 10 illustrates fading virtual objects based on a priority system similar to the priority systems described in FIGS. 7A through 9C. FIG. 10 does not limit the scope of this disclosure to any particular embodiments. While the method 1000 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method fading objects is performed by the rendering engine 340 of FIG. 3 and described with respect to the electronic device 200 of FIG. 2, and the electronic device 300 of FIG. 3 and any client devices 106-115 of FIG. 1. However, the method 1000 can be used with any other suitable system.

In block 1010, the rendering engine 340 identifies a priority level of each object displayed on the HMD. The rendering engine 340 also identifies relationships between each virtual object based on the identified priority level associated with each virtual object. In certain embodiments, the rendering engine 340 can determine a particular priority system to use when initializing the AR environment. For example, the rendering engine 340 determines a particular priority system to use, and the defined relationships between each of the priority levels of the priority system.

In block 1020, the rendering engine 340 determines whether an input is received that that matches a defined priority relationship. In certain embodiments, the input can be a based on a user input, or detected motion through an internal measurement unit (IMU) motion sensor associated with the electronic device. The IMU motion sensor can be affixed to HMD or a controller connected to the HMD and used by the user to interact with the AR environment. In certain embodiments, the input can be based on an eye tracking system included in the HMD that tracks the eye gaze of the user. In certain embodiments, the input can be a based on tracking the hand, or hands, of the user. For example, the rendering engine 340 identifies whether a particular user hand movement or gesture, is a particular user input that is used to control or interact with various features of the AR environment. In certain embodiments, the input can be a based on a particular variable such as time, distance, or when a new virtual object is rendered in the AR environment.

In block 1030, the rendering engine 340 determines whether a condition is made that indicates a need to alter the identified priority of one of the virtual objects. For example, if a user interacts with a particular object, the priority of the object can be increased. In another example, when a new object is rendered the priority of the new object or the priority of the existing objects can change.

In block 1040, the rendering engine 340 modifies an object based on the priority level of the object as compared to the priority level of the other virtual objects. For example, the rendering engine 340 modifies an object by correlating the priority level of the object to that of the priory levels of the other objects on the display. Based on the priority scheme the rendering engine 340 can cause one object to become transparent or semi-transparent while maintaining the opacity of other objects. The rendering engine 340 can also determine whether an object overlaps another object when determining to change the transparency of an element.

In certain embodiments, the rendering engine 340 repeats the method 1000 at a predefined time interval, the occurrence of a new frame, or based on an event. The event can include when a user interacts with a particular virtual object. The event can also occur when two or more objects overlap, such as when a HUD element (such as HUD element 430 of FIGS. 4A, 4B, 4C, and 4D and the HUD element 930 of FIGS. 9A, 9B, ad 9C) collides with a pinned element (such as pinned element 435 of FIGS. 4A, 4B, 4C, and 4D and the pinned element 935a and 935b of FIGS. 9A, 9B, ad 9C). In certain embodiments, the rendering engine 340 can to fade objects differing amounts. For example, if the object is not interacted with for a predetermined period of time the object can be removed from the display. In another example, the object can be faded a certain predetermined level based on the defined relationship between the object and another object.

FIGS. 11A, 11B, and 11C illustrate an example display depicting various augmented reality objects in accordance with an embodiment of this disclosure. FIGS. 11A, 11B, and 11C illustrate AR environment 1100a, 100b, and 1100c (collectively 1100). The AR environment 1100 is similar to the AR environment 800b of FIG. 8B. The embodiment as shown in the FIGS. 11A, 11B, and 11C are for illustration only. Other embodiments can be used without departing from the scope of the present disclosure.

Virtual objects rendered on a display, can extend beyond the display in an AR environment. The FOV of a user is often larger than the display screen. Due to the difference between the size of the FOV of the user and the size display screen, objects displayed on the screen can be cut off as the element can extend beyond the size of the screen. As a result, if part of an object is rendered on the display while another part of the object is rendered off the display, the user could be unaware that additional content is available to be viewed.

In certain embodiments, the rendering engine 340 can fade the edge of virtual objects rendered partially on the screen and partially off the screen by applying a texture border around the perimeter of the display. The texture border can be applied while the scene is being constructed. The texture border can be applied in a after the scene is processed. For example, after the frame is rendered, the texture border is applied to the scene as a post processing affect prior to displaying the scene.

For example, if the screen is an additive display, such that the color black appears transparent on the display, the texture border can gradually decrease the RGB values to turn the pixel black. When a pixel is fully black (such as when the RGB value is 0, 0, 0) the pixel is displayed as transparent. Similarly, the closer the RGB value of each pixel is to 0, 0, 0, the darker the pixel is which results in the transparency of the pixel increasing. For instance, the darker the pixel the more translucent the pixel that is rendered on the display becomes. A texture border can include a gradient, from light to dark as the texture approaches the perimeter of the display. That is, the texture border can be gradient that goes from light to dark the closer the border is towards the edge of the display. As a result, the texture border that overlays the perimeter of the display, can cause virtual objects that are displayed to become faded the closer the virtual object is to the edge of the display. It is noted that the textured border has the same aspect ratio and size as the display. As a result, the overlay creates fully transparent edges with increasing opacity as the further the virtual object is from the perimeter of the display.

In another example, if the screen is an additive display, the rendering engine 340 can analyze the individual pixels and modify the pixels on a pixel by pixel basis instead of an applying an overlay. For instance, the rendering engine 340 can analyze how close each pixel is to the edge of the display. The closer a pixel is to the edge of the display, a larger percentage of the color of the pixel is removed. In contrast, the further the pixel is away from the edge of the display, less is subtracted from the color value of the pixel. For example, the rendering engine 340 analyzes the distance of each pixel of a virtual object rendered on the display, to the closest edge of the display. The rendering engine 340 then gradually decreases the RGB value of each pixel as the pixel approaches the edge of the display, until the pixel is black. When the pixel is black the pixel is transparent. Similarly, the closer each pixel is to the color black (such as an RGB value of 0, 0, 0,) the more translucent the pixel is.

In certain embodiments, if there is any display distortion, then the rendering engine 340 pre-distorts the scene and then undistorts the scene as the scene enters the retina of the user. For example, objects can be pre-distorted to account for specific optics of a display associated with a HMD. Since the same image can be rendered for each eye of the user, distortion can be applied to virtual objects to compensate for any issues with the optics of a display. Therefore, when the rendering engine 340 analyzes the pixels of the display, it analyzes the pixels based on screen units prior to applying a distortion.

The AR environment 1100a, depicts the same AR environment 800b of FIG. 8B but includes the display 1110. For example, the calendar entry 1102a is the same as the calendar event 802a, the flower 1104a is the same as the flower 804a, and the messaging application 1106a is the same as the messaging application 806a. The display 1110 is a display similar to the display 255 of FIG. 2, the display 310 of FIG. 3, the display area 425 of FIGS. 4A, 4B, 4C, and 4D, and the display area 925 of FIGS. 9A, 9B, and 9C. As illustrated the virtual objects (such as the calendar entry 1102a, the flower 1104a, and the messaging application 1106a) extend beyond the display 1110. Since the virtual objects extend beyond the display, the AR environment 1100b depicts the virtual objects cut off as it would appear to a user of the HMD. That is, each virtual object is rendered partially on the display and partially off the display. For example, the user only views a portion of the calendar entry 1102a, the flower 1104a, and the messaging application 1106a. Since the calendar entry 1102a, the flower 1104a, and the messaging application 1106a are partially cut off the user could be unaware that an additional portion of each virtual object exists beyond the viewing direction of the user. For instance, if the user would look towards the left, right, or down, the additional portions of the virtual objects would be seen by the user.

The AR environment 1100c includes a gradient border that is applied to the perimeter of the display 1110. The gradient border fades the edges of virtual objects as the object approaches the edge of the display. By fading the edge of a virtual object the user can identify that a virtual object extends beyond the displayed area. When an object is rendered partially on the display and partially off the display, the rendering engine 340 fades the edge of the object by either applying a gradient overlay border or analyzing the pixels and removing color values of each pixel the closer the pixel is to the edge of the display. Fading or softening the edge of the object as it approaches the edge of the screen provides a clear distinction between a virtual object that is fully rendered on the screen and a virtual object that is rendered partially on the screen and partially off the screen. By fading the edge of the object provides an indication to the user that additional content is viewable to in a direction beyond the screen (such as to the left, right, up, or down).

Figure 12:
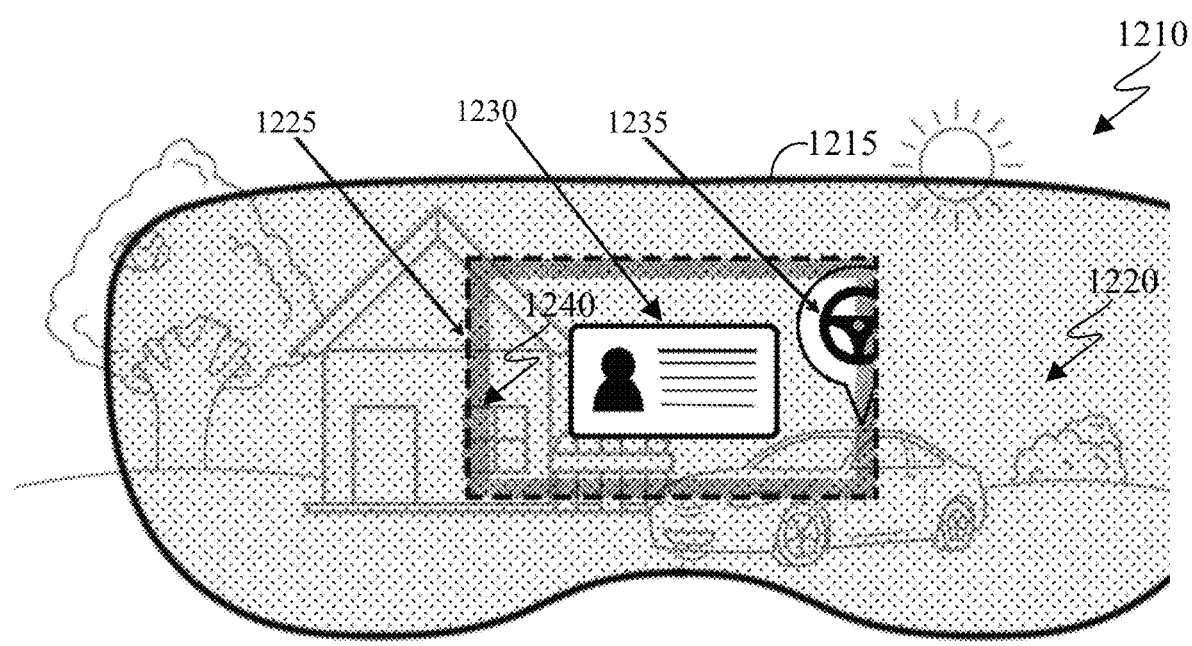
FIG. 12 illustrates an example head mounted display depicting various augmented reality objects in accordance with an embodiment of this disclosure.

FIG. 12 illustrates an example HMD depicting various augmented reality objects in accordance with an embodiment of this disclosure. FIG. 12 is similar to FIGS. 11A, 11B, and 11C, such that as a virtual object reaches the edge of a display the edge of the virtual object is faded. FIG. 12 is similar to FIGS. 4A, 4B, 4C, 4D, 9A, 9B, and 9C. The embodiment as shown in the FIG. 12 is for illustration only. Other embodiments can be used without departing from the scope of the present disclosure.

FIG. 12 depicts the HMD 1215 includes lens 1220 that include a display area 1225. In certain embodiments, the lens 1220 is transparent or semi-transparent. The lens 1220 allows a user to view both the real world 1210 and the display area 1225 as the lens is transparent or semi-transparent. The display area 1225 includes a gradient overlay 1240. The display area 1225 also displays to the user of the HMD 1215 a HUD element 1230 and a pinned element 1235. The pinned element 1235 is partially on the display and partially off the display. The gradient overlay 1240 gradually darkens as the boarder extends towards the outside edge of the display. As a result, the pinned element 1235 gradually darkens as it extends towards the edge of the display. By gradually darkening the pinned element 1235 as it approaches the edge of the display, the pinned element 1235 appears transparent at the edge of the display and gradually translucent to opaque as the pixels of pinned element 1235 are displayed further from the edge of the display.

Figure 13:
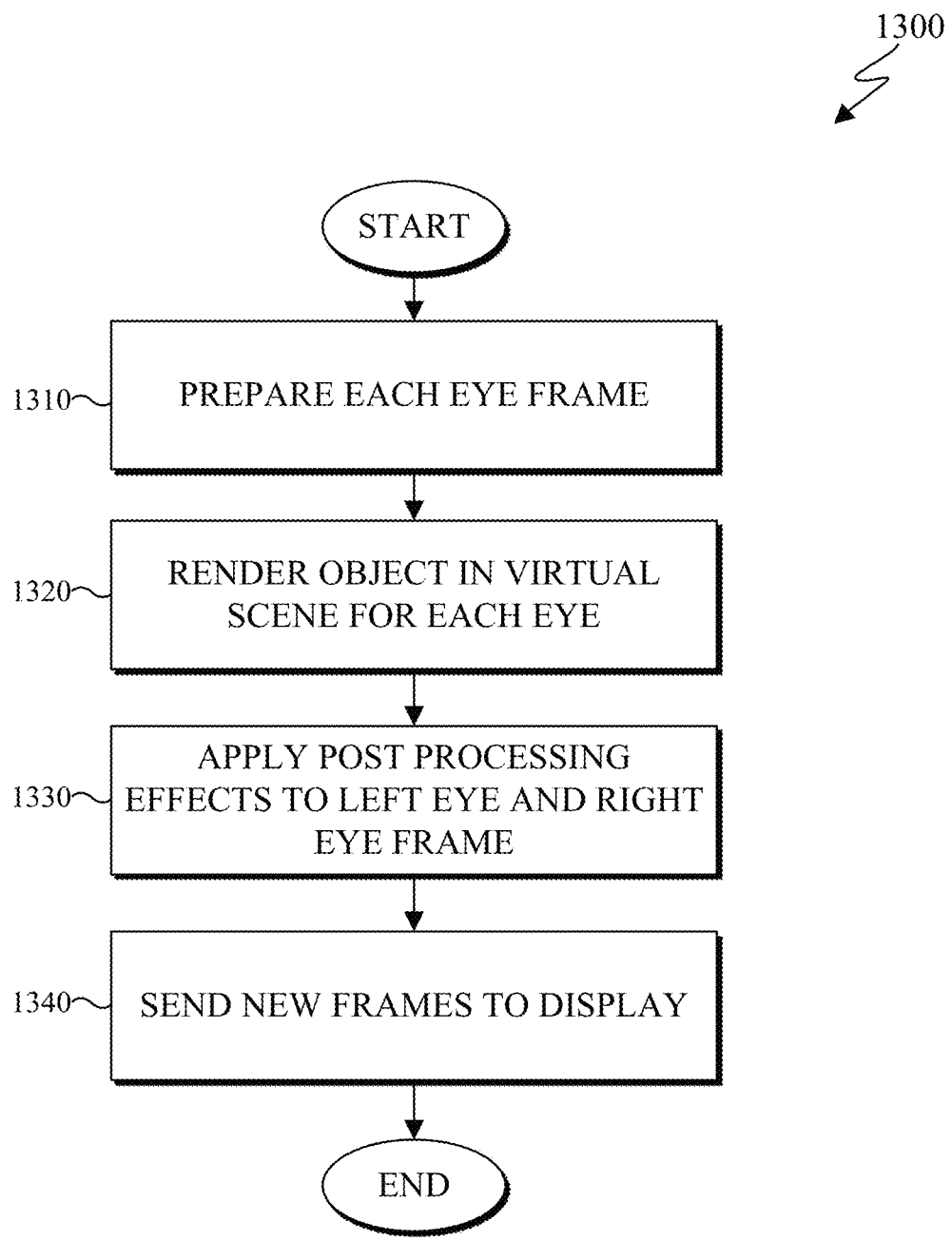
FIG. 13 illustrates a method for fading an edge of a virtual object displayed on an electronic device in accordance with an embodiment of this disclosure.

FIG. 13 illustrates a method 1300 for fading an edge of a virtual object displayed on an electronic device in accordance with an embodiment of this disclosure. FIG. 13 illustrates fading virtual objects based as the object approaches the edge of the display. In certain embodiments, the method 1300 of FIG. 13 describes the edge fading as discussed with respect to FIGS. 11A, 11B, 11C, and 12. FIG. 13 does not limit the scope of this disclosure to any particular embodiments. While method 1300 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method fading objects is performed by the rendering engine 340 of FIG. 3 and described with respect to the electronic device 200 of FIG. 2, and the electronic device 300 of FIG. 3 and any client devices 106-115 of FIG. 1. However, the method 1300 can be used with any other suitable system.

In block 1310, the rendering engine 340 prepares each eye frame. If the HMD is a stereoscopic display, rendering engine 340 prepares an eye frame for the left eye and an eye frame for the right eye. If the HMD is not a stereoscopic display, rendering engine 340 prepares a single frame that is used for both the right eye and the left eye.

In block 1320, the rendering engine 340 renders object in the virtual scene. For example, the rendering engine can render a texture that is applied in the scene. The texture can be a gradient texture. The texture fades the edge of any virtual object that approaches the edge of the display. The aspect ratio and size of the texture matches the aspect ratio and size of the display.

In block 1330, the rendering engine 340 applies post processing effects to the frames for the left eye and the right eye. In certain embodiments, the texture that was applied to the scene in block 1320 can alternatively be applied in post processing in the block 1330. In certain embodiments, the texture that was applied in block 1320 can be omitted and subtractive rendering can be implemented in the post processing of block 1330. In certain embodiments, the texture that was applied in block 1320 can be performed in addition to subtractive rendering in the block 1330.

In block 1340, the new frame is set to the display. The frame is based on the rendered objects from block 1320 and can include a texture. The frame can also include a post processing subtractive rendering in addition to or in place of the texture. When the frame is displayed on the display, any object that extends beyond the display is faded. The fading indicates to the user to additional content can be viewed. The user can view the additional content by chancing the FOV. For example, the user can turn their head (and sensors such as the orientation sensors 320 of FIG. 3 detect the motion and move the virtual objects accordingly) in the direction of the faded content to view the remainder of the content that extended off the screen.

Figure 14:
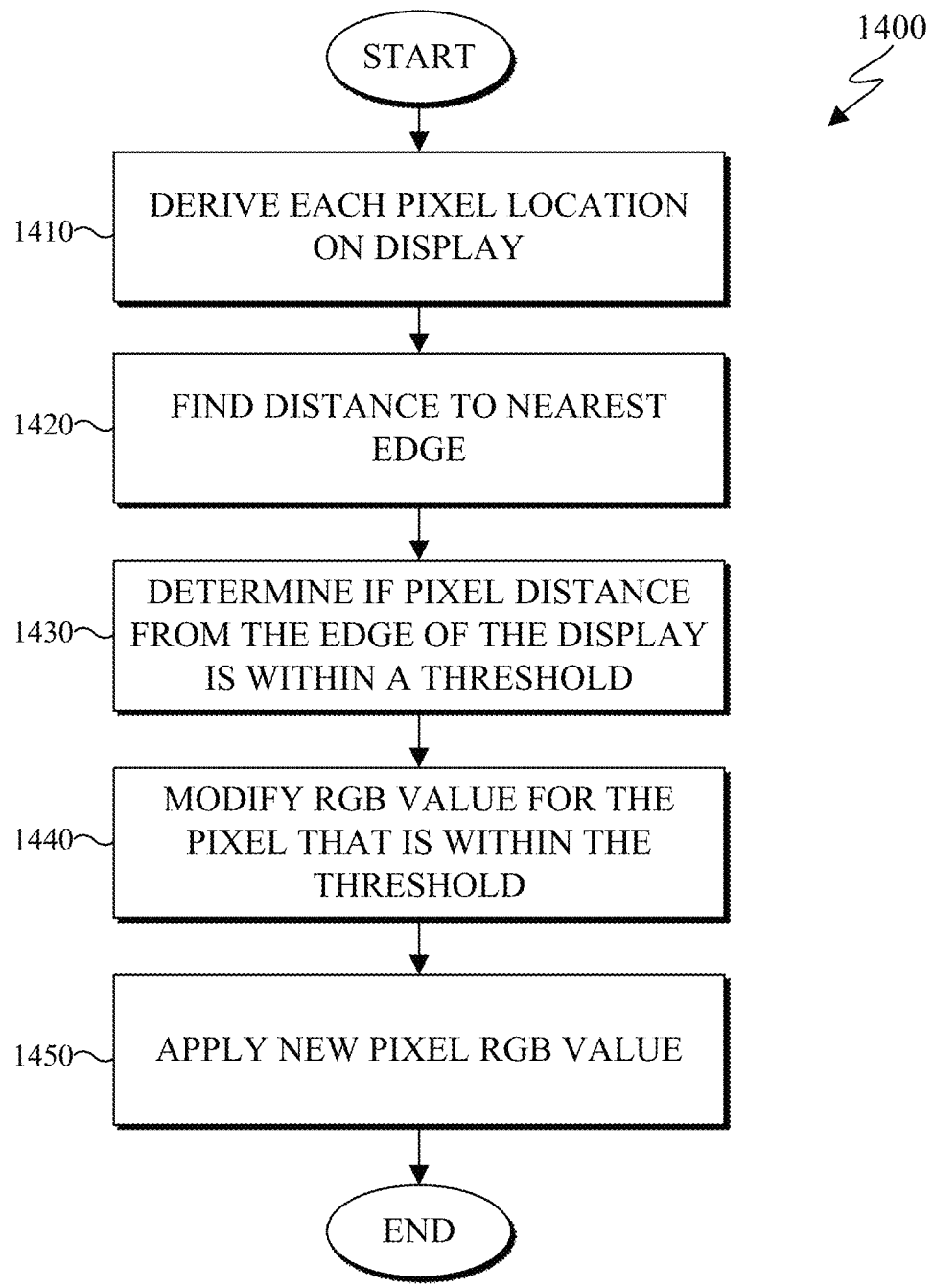
FIG. 14 illustrates a method for fading an edge of a virtual object displayed on an electronic device in accordance with an embodiment of this disclosure.

FIG. 14 illustrates a method for fading an edge of a virtual object displayed on an electronic device in accordance with an embodiment of this disclosure. FIG. 14 illustrates fading virtual objects based as the object approaches the edge of the display using subtractive rendering. In certain embodiments, the method 1400 of FIG. 14 describes the edge fading as discussed with respect to FIGS. 11A, 11B, 11C, 12, and 13. FIG. 14 does not limit the scope of this disclosure to any particular embodiments. While method 1400 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method fading objects is performed by the rendering engine 340 of FIG. 3 and described with respect to the electronic device 200 of FIG. 2, and the electronic device 300 of FIG. 3 and any client devices 106-115 of FIG. 1. However, the method 1400 can be used with any other suitable system.

In block 1410, the rendering engine 340 derives the location of each pixel of each virtual object that is to be rendered on the display. In block 1420 the rendering engine finds the distance from each pixel to the nearest edge of the display. For example, the rendering engine 340 identifies the edge of the display that is nearest to each pixel. After identifying the nearest edge, the rendering engine 340 calculates the distance between each pixel and the edge of the display closest to each respective pixel.

In block 1430, the rendering engine 340 determines if the calculated distance between each pixel and the edge of the display closest to each respective pixel is within a threshold. The threshold can be a threshold distance. The threshold distance can is based on the number of pixels between each respective pixel and the edge of the display. In block 1440, the rendering engine modifies the RGB value for each pixel within the threshold. For example, if a pixel is within a predetermined distance from the nearest edge, the rendering engine 340 modifies the RGB value of the pixel. If the pixel is outside the predetermined distance from the nearest edge, the no modification to the pixel is performed. The rendering engine modifies each pixel that is within the threshold based on the distance the pixel is from the nearest edge. If the display is an additive screen, modifying the color of the pixel can be based on the equation:

modified pixel RGB=original pixels RGB value−
  (256*(pixel edge distance/threshold value))     Equation 1:

In the above equation, 256 represent palette of colors that are associated with a single pixel, where each of the 256 entries in the palette map is given red, green, and blue values. The pixel edge distance is the distance the pixel is from the nearest edge of the display. The threshold value is the threshold value that is used to determine whether to modify the pixel. If the modified pixel value is less than 0, 0, 0, then the rendering engine 340 sets the color of the pixel to 0, 0, 0. If the modified pixel value is anything greater than 0, 0, 0, then the rendering engine 340 sets the color of the pixel to the calculated color, based on equation 1. Since an additive display does not display the color black, a pixel that is black is displayed with no color, such that the pixel is transparent.

In block 1450, the rendering engine 340 applies the modified pixels and renders the plurality of virtual objects on the display of the electronic device, based on the modified pixels. The rendered virtual objects can include one or more modified pixels, such that the object fades as the object approaches the edge of the display. Based on the modified RGB values, the fading increases the closer each pixel is to the edge of the display.

Figure 15A:
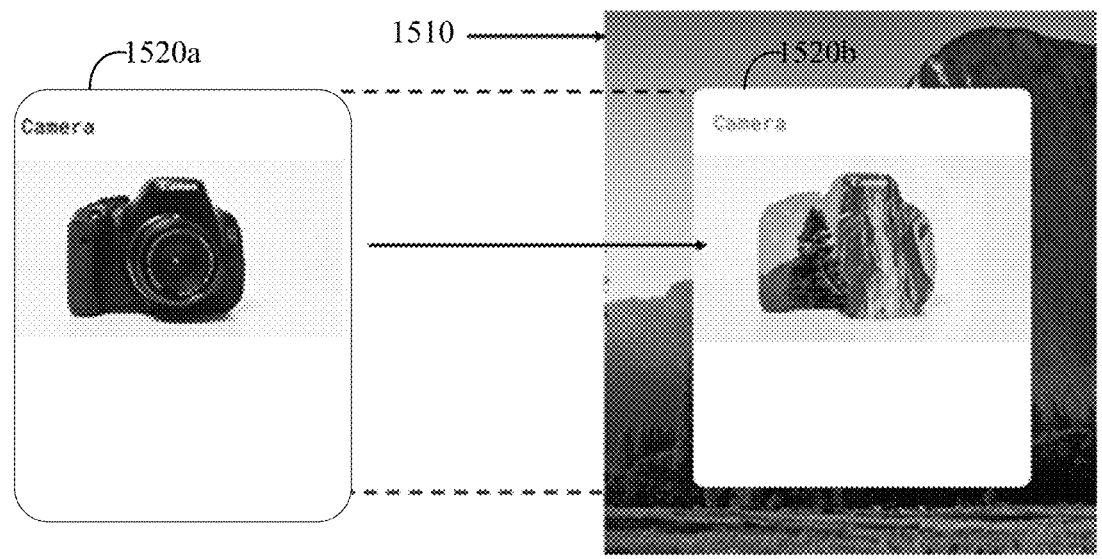
FIGS. 15A and 15B illustrate example diagrams for increasing visibility of an object displayed on a display in accordance with an embodiment of this disclosure.
Figure 15B:
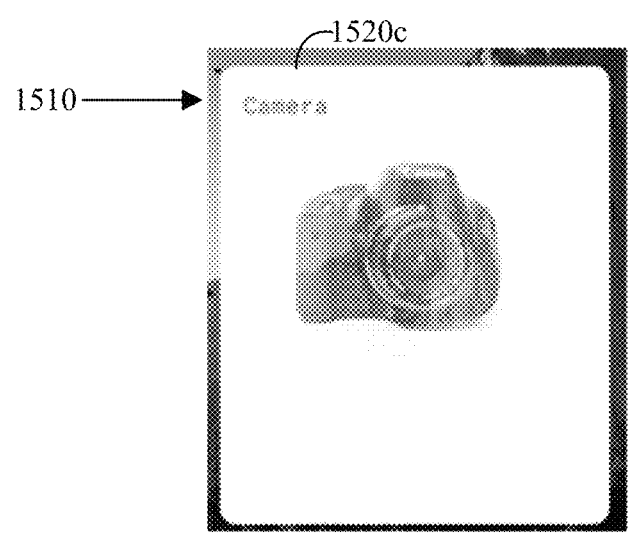

FIGS. 15A and 15B illustrate example diagrams for increasing visibility of an object displayed on a display in accordance with an embodiment of this disclosure. In certain embodiments, FIGS. 15A and 15B represent a view as seen through a HMD where the display is an additive display. The embodiment as shown in the FIGS. 15A and 15B are for illustration only. Other embodiments can be used without departing from the scope of the present disclosure.

FIG. 15A illustrates a deconstructed view of a virtual object 1520a. The virtual object includes text and an image of a dark object, such as a camera. FIG. 15A also illustrates a view of the real world 1510 with a virtual object 1520b displayed over the real world 1510 view. The virtual object 1520a and 1520b represent the same virtual object, however a traditional display screen displays the virtual object 1520a whereas the virtual object 1520b is displayed on an additive display. The additive display does not display the color black. Objects that are black become transparent on an additive display. Pixels become transparent the amount the pixel is black. Since a portion of the virtual object 1520a is black when the virtual object 1520b is rendered on the display, the portion that is black becomes transparent and difficult to view. In certain embodiments, the virtual object 1520a and 1520b include two tags, one tag can be assigned to the text "camera" while the other tag is applied to the image of a camera.

FIG. 15B illustrates a modified virtual object 1520c over the real world 1510.the virtual object 1520c is the same virtual object as 1520a and 1520b, however the pixels that construct the virtual object are modified in order to increase the visibility of the virtual object. The virtual object 1520c when rendered can be a reflected on a visor, projected through a waveguide system or through a different projection method or device. Prior to rendering the virtual object 1520c, the rendering engine 340 applies a modification to pixels that are included in an image. In certain embodiments, the rendering engine 340 does not modify pixels of text, such that only an image, such as the image of the camera and not the text "camera" are modified.

Figure 16:
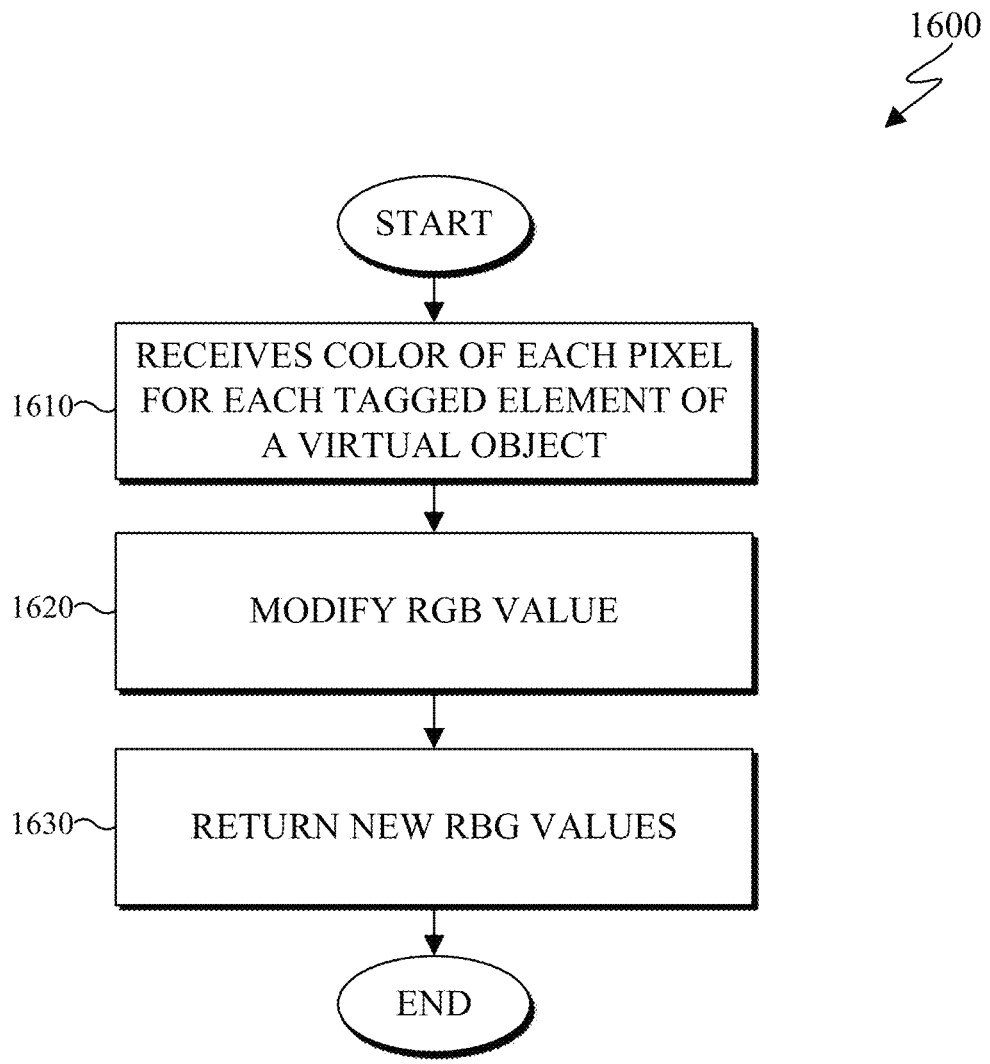
FIG. 16 illustrates a method for increasing viability an object on a display of on an electronic device in accordance with an embodiment of this disclosure.

FIG. 16 illustrates a method for increasing visibility of an object on a display of on an electronic device in accordance with an embodiment of this disclosure. In certain embodiments, the method 1600 of FIG. 16 describes brightening an object as discussed with respect to FIGS. 15A, and 15B. FIG. 16 does not limit the scope of this disclosure to any particular embodiments. While method 1600 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method fading objects is performed by the rendering engine 340 of FIG. 3 and described with respect to the electronic device 200 of FIG. 2, and the electronic device 300 of FIG. 3 and any client devices 106-115 of FIG. 1. However, the method 1600 can be used with any other suitable system.

In block 1610, the rendering engine 340 receives a color associated with each pixel of a tagged element of a virtual object. Each virtual object can have tagged portions and non-tagged portions. A tagged portion is associated with a portion of the virtual object that the rendering engine 340 is to modify. A non-tagged portion is associated with a portion of the virtual object that the rendering engine 340 does not modify. In certain embodiments, the rendering engine 340 does not modify pixels associated with text.

In certain embodiments, the rendering engine 340 detects when a portion of a virtual object includes a tag. In certain embodiments, the rendering engine 340 determines whether a virtual object or portion of the virtual would be displayed dark or transparent, such that the virtual object would have low visibility to the user. If the rendering engine 340 determines a portion of the virtual would be displayed with low visibility, the rendering engine 340 can assign a tag itself. The rendering engine 340 can include text recognition in order to tag an image and not tag text that is included in a virtual object.

In block 1620, the rendering engine 340 modifies the RGB value of each pixel of a tagged portion of a virtual object. Modifying the pixel increases the visibility of the portion of the virtual object. In certain embodiments, increasing the visibility includes increasing the brightness of the object. In certain embodiments, modifying the visibility of a pixel can be based on a linear, square, or logarithmic pixel value remapping. Modifying the pixel can include remapping the RGB values in the domain [0, 255] based on a logarithmic curve. Modifying the viability of a pixel based on a logarithm curve can be based on the equation:

New RGB value=log(old$R,G$, or $B$,value+1)*255/log (256). Equation 2:

In block 1630, the rendering engine 340 returns new RGB values for the tagged portions of a virtual object. The rendering engine 340 can then apply the modified pixels and render the virtual object on the display. The rendered virtual object can include one or more modified pixels to increase a tagged portion of a virtual object.

Figure 17:
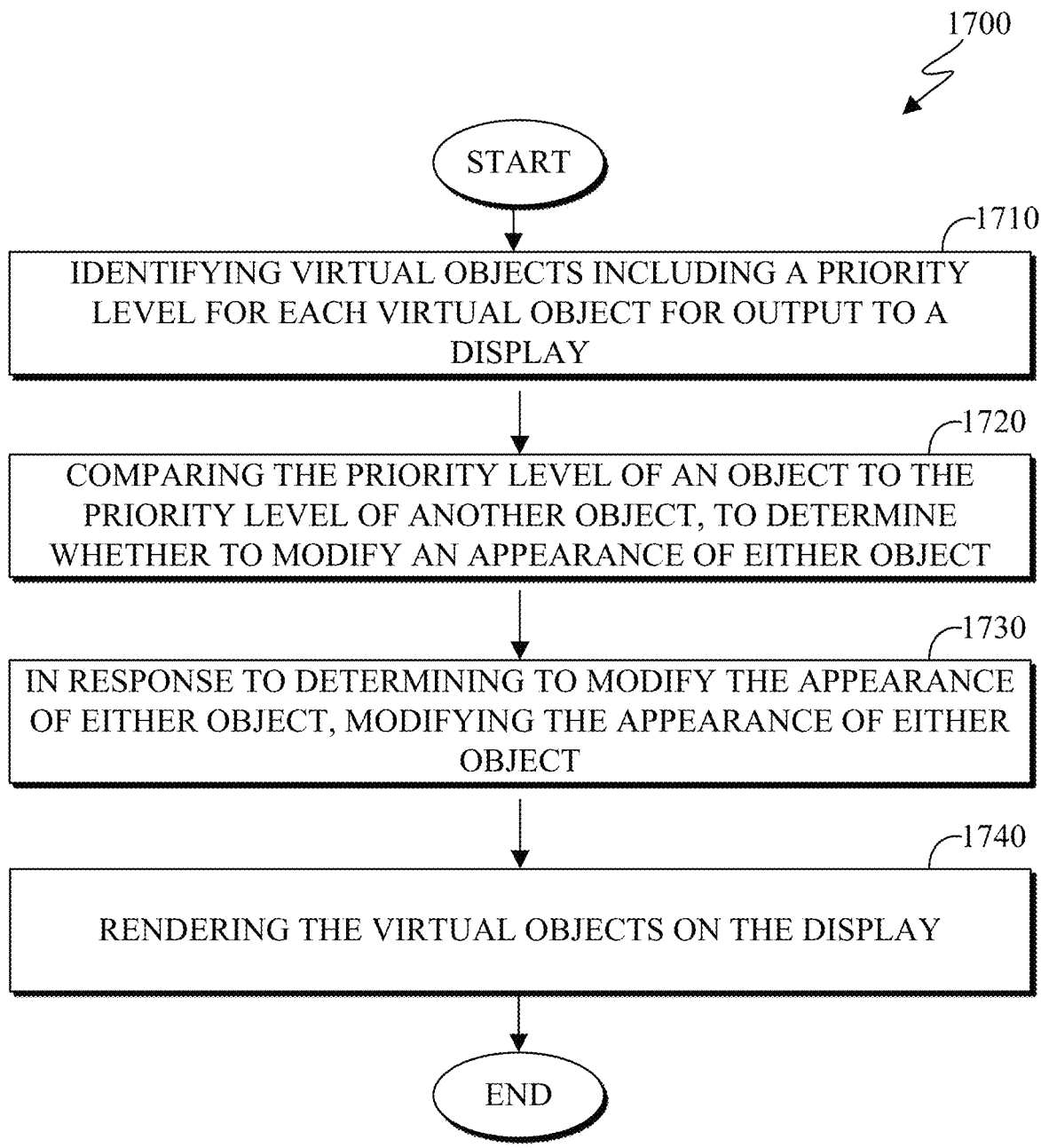
FIG. 17 illustrates a method for modifying displayed objects on electronic device in accordance with an embodiment of this disclosure.

FIG. 17 illustrates a method 1700 for modifying displayed objects on electronic device in accordance with an embodiment of this disclosure. While method 1700 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method for modifying displayed objects is performed by the rendering engine 340 of FIG. 3 and described with respect to the electronic device 200 of FIG. 2, and the electronic device 300 of FIG. 3 and any client devices 106-115 of FIG. 1. However, the method 1700 can be used with any other suitable system.

In block 1710, the rendering engine 340 identifying a plurality of virtual objects including a priority level for each of the plurality of virtual objects. The identified plurality of virtual objects are output to a display. For example, the rendering engine 340 identifies whether there are HUD elements (similar to the HUD element 430 of FIGS. 4A and 4B), pinned elements (pinned elements 435 of FIGS. 4C and 4D), notifications, and the like. Each virtual object is rendered, projected, or displayed on a display of a HMD, and a user views both the real world and one or more of the virtual objects. Each virtual object includes a priority level. The priority level can be preset by the user of the HMD, platform developer, or a third party developer.

For example, one or both hands of the user or a controller can be assigned a priority level zero (similar to the priority zero 710a of FIG. 7A). A system notification, an application notification, or a system menu can be assigned a priority level one (similar to the priority one 712a of FIG. 7A). A virtual object that the user is currently interacting with can be assigned a priority level two (similar to the priority two 714a of FIG. 7A). A default priority for any object rendered on the display can be assigned a priority level three (similar to the priority three 716a of FIG. 7a). A default priority for external application content, such as a retail sign as displayed in a public interfacing protocol can be assigned a priority level four (similar to the priority four 718a of FIG. 7a). Additional priorities can include a priority five that indicates to the rendering engine 340 that after a predetermined period of time, with the user not interacting with the virtual; object, the virtual object can be removed from the display.

In block 1720, the rendering engine 340 compares the priority level of an object to the priority level of another object, to determine whether to modify an appearance of either object. That is, the rendering engine 340 compares the priority level of an object of the plurality of virtual objects to the priority level associated with another object of the plurality of virtual objects to determine whether to modify an appearance of either object. For example, if a priority level zero (similar to priority zero 710a of FIG. 7a) is rendered on the display, the rendering engine 340 determines whether to modify the virtual object with the priority level zero, the virtual object with either a higher or lower priority, or determine to modify neither object. When the priority level zero is rendered on the display the rendering engine 340 determines not to modify any object on the display, as the priority level zero does not affect any object on the display.

In another example, if a priority level one (similar to priority one 712a of FIG. 7A) is rendered on the display, the rendering engine 340 determines whether to modify the virtual object with the priority level one, as compared to another virtual object with either a higher or lower priority, or determine to modify neither object. When the priority level one is rendered on the display the rendering engine 340 determines to modify any other virtual object that has a priority level of two, three, four, and the like. If there is a priority level zero on the display in addition to a priority level one, the rendering engine 340 determines not to modify either of the virtual objects.

In another example, if a priority level three (similar to priority three 716a of FIG. 7A) is rendered on the display, the rendering engine 340 determines whether to modify the virtual object by comparing the virtual object to another virtual object that could have either a higher or lower priority. In certain embodiments, the rendering engine 340 can determine modify neither object. The rendering engine 340 through the HMD can receive data about a state of the electronic device that is associated with the plurality of virtual objects rendered on the display. The state date can include (i) a change of an eye gaze with respect to the one of virtual objects rendered on the display, (ii) a received input from a controller associated with the electronic device, or (iii) a received input from one or more sensors of the electronic device. After receiving the state data, the rendering engine 340 determining whether to alter the priority level associated with one of the plurality of virtual objects, based on the received state data. For example, state data can indicate whether the user is interacting with one of the virtual objects rendered on the display. In certain embodiments, the rendering engine 340 determines to alter the priority level of an object that the user is interacting with, when the priority level of the object is a priority level three. Thereafter, in response to determining to alter the priority level of the virtual object, the rendering engine 340 changes the priority level from a priority level three to a priority level two. Afterwards, the rendering engine 340 determines whether two of the plurality of virtual objects occupy a similar portion of the display. When two of the plurality of virtual objects occupy a similar portion of the display, the rendering engine 340 can determine to modify the appearance of one of the objects, if one object is a priority level two and the other object is a lower priority, such as a priority level three.

In certain embodiments, the rendering engine 340 can identify that a priority level of a virtual object includes a timer. The timer can count down from a predetermined number to zero, or count from zero to a predetermined time. The timer resets in response to a received input with respect that the virtual object. The rendering engine 340 monitors the virtual object that include a timer to determine whether to modify an appearance of either object based on when the timer expires.

In block 1730, in response to determining to modify the appearance of either object, the rendering engine 340 modifying the appearance of either object. For example, if a virtual object with an identified priority level one (similar to the priority one 712a of FIG. 7A) is rendered on the display, and a virtual object with an identified priority level of two, three or four (similar to the priorities 714a, 716a, 718a, or 720a of FIG. 7a, respectively), the rendering engine 340 modifies the appearance of the virtual object with the identified priority level of two, three or four, by fading the virtual object. Fading the virtual object can cause the virtual object to become semi-transparent or translucent, when the virtual object is displayed.

In certain embodiments, the rendering engine 340 modifies a virtual object by fading the virtual object a predetermined percentage based on the difference in priority values between the two or more virtual objects. For example, a virtual object with a priority level of one and a virtual object with a priority level of three, the rendering engine 340 can fade the virtual object with the priority level of three a higher percentage as compared to a virtual object with a priority level of one and a virtual object with a priority level of two.

In block 1740, the rendering engine 340 renders the virtual objects on the display. The rendered virtual objects can include one or more modified virtual objects or non-modified virtual objects.

In certain embodiments, the rendering engine 340 identifies at least one virtual object that includes a portion that extends off the display. If a virtual object includes a portion that extends off the display, the rendering engine 340 can determine a set of pixels of the virtual object that approach the edge of the display. The rendering engine 340 can then apply a gradient texture overlay that alters the set of pixels. For example, altering the set of pixels can fade the pixels of the virtual object that that approach the edge of the display. For example, a texture can overlay the entire display and cause any pixel that approaches the edge of the display to fade. The texture can be a gradient such that the pixels closer to the edge of the display are faded more than the pixels that are further away from the edge of the display.

In another example, the rendering engine 340 can determine a set of pixels of the virtual object that extends off the display that are located within a threshold distance from an edge of the display. The rendering engine 340 derives the distance between each pixel of the set of pixels and the edge of the display that is within the threshold distance. For instance, the rendering engine 340 identifies the closest edge of the display to each pixel and calculates the distance between each pixel and the edge of the display. Thereafter, the rendering engine 340 modifies the pixel based on subtractive rendering. Subtractive rendering reduces the color value associated with each pixel based on the distance the pixel is from the edge of the display. For instance, a pixel that is closer to the edge of the display is modified more than a pixel further from the edge of the display. The pixels that are closer to the edge of the display are modified more, and therefore rendered more transparent than pixels that are located further from the edge of the display. In contrast, the pixels that are further from the edge of the display are modified less, and therefore rendered more opaque that the pixels that are located closer to the edge of the display.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for object display on an electronic device, the method comprises:
   identifying a plurality of virtual objects for output to a display of the electronic device, including a priority level for each of the plurality of virtual objects;
   rendering a first object and a second object of the plurality of virtual objects on the display of the electronic device, wherein the first object and the second object are rendered opaque when the priority level of the first object matches the priority level of the second object and the first object and the second object do not overlap;
   in response to receiving an indication that the first object is selected, changing the priority level of the first object;
   when the first object is moved to overlap the second object, comparing the priority level of the first object to the priority level of the second object to determine whether to modify an appearance of either object;
   in response to determining to modify the appearance of either object, altering a transparency level of either the first object or the second object, based on the comparison of the priority level of the first object and the priority level of the second object; and
   restoring the appearance of the first object and the second object when the first object and the second object do not overlap.

2. The method of claim 1, further comprising:
   identifying that the priority level of the first object that is rendered on the display includes a timer, wherein the timer is reset in response to a received input that is associated with the first object;
   while the first object is rendered on the display, monitoring the timer to detect when the timer approaches a predetermined time limit; and
   when the time reaches the predetermined time limit, rendering the first object on the display is discontinued.

3. The method of claim 1, further comprising:
   receiving data about a state of the electronic device that is associated with the plurality of virtual objects rendered on the display;
   determining whether to alter the priority level associated with one object of the plurality of virtual objects, based on the received state data;
   in response to determining to alter the priority level of the one object of the plurality of virtual objects, changing the priority level of the one object of the plurality of virtual objects, based on the received state data;
   determining whether two of the plurality of virtual objects occupy a similar portion of the display of the electronic device;
   in response to determining that two of the plurality of virtual objects occupy the similar portion of the display of the electronic device, modifying the appearance of either object based on the changed priority; and
   in response to determining that two of the plurality of virtual objects occupy separate portions of the display of the electronic device, maintaining the appearance of the plurality of virtual objects on the display.

4. The method of claim 3, wherein the received state data indicates at least one of:
   a change of an eye gaze with respect to one or more of the plurality of virtual objects rendered on the display,
   a received input from a controller associated with the electronic device, or
   a received input from one or more sensors of the electronic device.

5. The method of claim 1, further comprising:
   identifying at least one object of the plurality of virtual objects that includes a tag;
   determining whether to modify the appearance of the at least one object rendered on the display, based on the tag; and
   in response to determining to modify the appearance of the one object, modifying a set of color values to increase visibility of the at least one object.

6. The method of claim 1, further comprising:
   identifying at least one object of the plurality of virtual objects, where a portion of the one object extends off the display;
   determining a set of pixels of the at least one object that are located within a threshold distance from an edge of the display; and
   deriving a distance between each pixel of the set of pixels and the edge of the display that is within the threshold distance; and
   in response to deriving the distance between each pixel and the edge of the display, modifying each pixel of the set of pixels, based on subtractive rendering.

7. The method of claim 1, further comprising:
   identifying at least one object of the plurality of virtual objects, where a portion of the one object extends off an edge of the display; and
   applying a gradient overlay that alters pixels of the at least one object that approach the edge of the display.

8. An electronic device comprising:
   a display; and
   a processor operably coupled to the display, wherein the processor is configured to:
      identify a plurality of virtual objects for output to the display of the electronic device, including a priority level for each of the plurality of virtual objects,
      render a first object and a second object of the plurality of virtual objects on the display of the electronic device, wherein the first object and the second object are rendered opaque when the priority level of the first object matches the priority level of the second object and the first object and the second object do not overlap,
      in response to receiving an indication that the first object is selected, changing the priority level of the first object,
      when the first object is moved to overlap the second object, compare the priority level of the first object to the priority level of the second object to determine whether to modify an appearance of either object,
      in response to determining to modify the appearance of either object, altering a transparency level of either the first object or the second object, based on the comparison of the priority level of the first object and the priority level of the second object, and
      restore the appearance of the first object and the second object when the first object and the second object do not overlap.

9. The electronic device of claim 8, wherein the processor is further configured to:
   identify that the priority level of the first object that is rendered on the display includes a timer, wherein the timer is reset in response to a received input that is associated with the first object;

while the first object is rendered on the display, monitor the timer to detect when the timer approaches a predetermined time limit; and when the time reaches the predetermined time limit, discontinue to render the first object on the display.

10. The electronic device of claim 8, wherein the processor is further configured to:

receive data about a state of the electronic device that is associated with the plurality of virtual objects rendered on the display;

determine whether to alter the priority level associated with one object of the plurality of virtual objects, based on the received state data;

in response to determining to alter the priority level of the one object of the plurality of virtual objects, change the priority level of the one object of the plurality of virtual objects, based on the received state data;

determine whether two of the plurality of virtual objects occupy a similar portion of the display of the electronic device;

in response to determining that two of the plurality of virtual objects occupy the similar portion of the display of the electronic device, modify the appearance of either object based on the changed priority; and in response to determining that two of the plurality of virtual objects occupy separate portions of the display of the electronic device, maintain the appearance of the plurality of virtual objects on the display.

11. The electronic device of claim 10, wherein the received state data indicates at least one of:

a change of an eye gaze with respect to one or more of the plurality of virtual objects rendered on the display, a received input from a controller associated with the electronic device, or a received input from one or more sensors of the electronic device.

12. The electronic device of claim 8, wherein the processor is further configured to:

identify at least one object of the plurality of virtual objects that includes a tag;

determine whether to modify the appearance of the at least one object rendered on the display, based on the tag; and in response to determining to modify the appearance of the one object, modify a set of color values to increase visibility of the at least one object.

13. The electronic device of claim 8, wherein the processor is further configured to:

identify at least one object of the plurality of virtual objects, where a portion of the one object extends off the display;

determine a set of pixels of the at least one object that are located within a threshold distance from an edge of the display; and derive a distance between each pixel of the set of pixels and the edge of the display that is within the threshold distance; and in response to deriving the distance between each pixel and the edge of the display, modify each pixel of the set of pixels, based on subtractive rendering.

14. The electronic device of claim 8, wherein the processor is further configured to:

identify at least one object of the plurality of virtual objects, where a portion of the one object extends off an edge of the display; and apply a gradient overlay that alters pixels of the at least one object that approach the edge of the display.

15. A non-transitory computer readable medium embodying a computer program, the computer program comprising computer readable program code that, when executed by a processor of an electronic device causes the processor to:

identify a plurality of virtual objects for output to a display of the electronic device, including a priority level for each of the plurality of virtual objects;

render a first object and a second object of the plurality of virtual objects on the display of the electronic device, wherein the first object and the second object are rendered opaque when the priority level of the first object matches the priority level of the second object and the first object and the second object do not overlap;

in response to receiving an indication that the first object is selected, changing the priority level of the first object;

when the first object is moved to overlap the second object, compare the priority level of the first object to the priority level of the second object to determine whether to modify an appearance of either object;

in response to determining to modify the appearance of either object, altering a transparency level of either the first object or the second object, based on the comparison of the priority level of the first object and the priority level of the second object; and restore the appearance of the first object and the second object when the first object and the second object do not overlap.

16. The non-transitory computer readable medium of claim 15, wherein the computer readable program code when executed at the processor, further causes the processor to:

identify that the priority level of the first object that is rendered on the display includes a timer, wherein the timer is reset in response to a received input that is associated with the first object;

while the first object is rendered on the display, monitor the timer to detect when the timer approaches a predetermined time limit; and when the time reaches the predetermined time limit, discontinue to render the first object on the display.

17. The non-transitory computer readable medium of claim 15, wherein the computer readable program code when executed at the processor, further causes the processor to:

receive data about a state of the electronic device that is associated with the plurality of virtual objects rendered on the display;

determine whether to alter the priority level associated with one object of the plurality of virtual objects, based on the received state data;

in response to determining to alter the priority level of the one object of the plurality of virtual objects, change the priority level of the one object of the plurality of virtual objects, based on the received state data;

determine whether two of the plurality of virtual objects occupy a similar portion of the display of the electronic device;

in response to determining that two of the plurality of virtual objects occupy the similar portion of the display of the electronic device, modify the appearance of either object based on the changed priority; and in response to determining that two of the plurality of virtual objects occupy separate portions of the display of the electronic device, maintain the appearance of the plurality of virtual objects on the display.

18. The non-transitory computer readable medium of claim 15, wherein the computer readable program code when executed at the processor, further causes the processor to:

identify at least one object of the plurality of virtual objects that includes a tag;

determine whether to modify the appearance of the at least one object rendered on the display, based on the tag; and in response to determining to modify the appearance of the one object, modify a set of color values to increase visibility of the at least one object.

19. The non-transitory computer readable medium of claim 15, wherein the computer readable program code when executed at the processor, further causes the processor to:

identify at least one object of the plurality of virtual objects, where a portion of the one object extends off the display;

determine a set of pixels of the at least one object that are located within a threshold distance from an edge of the display; and derive a distance between each pixel of the set of pixels and the edge of the display that is within the threshold distance; and in response to deriving the distance between each pixel and the edge of the display, modify each pixel of the set of pixels, based on subtractive rendering.

20. The non-transitory computer readable medium of claim 15, wherein the computer readable program code when executed at the processor, further causes the processor to:

identify at least one object of the plurality of virtual objects, where a portion of the one object extends off an edge of the display; and apply a gradient overlay that alters pixels of the at least one object that approach the edge of the display.

* * * * *